(12) United States Patent
Higashitani et al.

(10) Patent No.: US 12,709,191 B2
(45) Date of Patent: Aug. 18, 2026

(54) CONTROL APPARATUS

(71) Applicant: DENSO CORPORATION, Kariya City (JP)

(72) Inventors: Mitsuharu Higashitani, Kariya City (JP); Masakatsu Shigyo, Kariya City (JP); Noriaki Ikemoto, Kariya City (JP)

(73) Assignee: DENSO CORPORATION, Kariya (JP)

( * ) Notice: Subject to any disclaimer, the term of this patent is extended or adjusted under 35 U.S.C. 154(b) by 765 days.

(21) Appl. No.: 18/099,527

(22) Filed: Jan. 20, 2023

(65) Prior Publication Data

US 2023/0234476 A1 Jul. 27, 2023

(30) Foreign Application Priority Data

Jan. 26, 2022 (JP) ................................ 2022-010300

(51) Int. Cl.
*B60L 58/27* (2019.01)
*B60L 53/20* (2019.01)
(Continued)

(52) U.S. Cl.
CPC ............... *B60L 58/27* (2019.02); *B60L 58/26* (2019.02); *H01M 10/46* (2013.01); (Continued)

(58) Field of Classification Search
CPC .......... B60L 58/27; B60L 58/26; B60L 53/20; B60L 2210/10; B60L 2240/545; B60L 2240/80; B60L 1/02; B60L 58/13; H01M 10/46; H01M 10/6571; H01M 2220/20; H01M 10/486; H01M 10/613; H01M 10/615; H01M 10/625; H01M 10/633;
(Continued)

(56) References Cited

U.S. PATENT DOCUMENTS

| | | | | |
|---|---|---|---|---|
| 5,834,132 A * | 11/1998 | Hasegawa | ........... | H01M 10/657 429/62 |
| 6,105,667 A * | 8/2000 | Yoshinori | ............ | B60N 2/5657 219/202 |

(Continued)

FOREIGN PATENT DOCUMENTS

| | | | | |
|---|---|---|---|---|
| CN | 102868173 B * | 5/2015 | ............. | Y02E 10/56 |
| CN | 111186322 A * | 5/2020 | .............. | B60L 53/14 |

(Continued)

OTHER PUBLICATIONS

Machine Translation of Description of JP2019186977A (Year: 2019).*

*Primary Examiner* — M Baye Diao
(74) *Attorney, Agent, or Firm* — Oliff PLC

(57) ABSTRACT

A control apparatus for a vehicle is provided. The vehicle includes a storage battery that stores therein electric power that is supplied from an external power supply apparatus and a rotating electric machine that is driven by electric power from the storage battery. The control apparatus includes a temperature adjusting unit that adjusts a temperature of the storage battery. The temperature adjusting unit performs an internal temperature adjustment process that is a process for adjusting the temperature of the storage battery using energy other than the electric power supplied from the power supply apparatus.

19 Claims, 11 Drawing Sheets

(51) Int. Cl.

| | |
|---|---|
| ***B60L 58/26*** | (2019.01) |
| ***H01M 10/46*** | (2006.01) |
| ***H01M 10/6571*** | (2014.01) |
| ***H02J 7/00*** | (2026.01) |
| ***H02J 7/90*** | (2026.01) |

(52) U.S. Cl.
CPC ......... *H01M 10/6571* (2015.04); *H02J 7/855* (2026.01); *H02J 7/977* (2026.01); *B60L 53/20* (2019.02); *B60L 2210/10* (2013.01); *H01M 2220/20* (2013.01)

(58) Field of Classification Search
CPC ... H02J 7/0063; H02J 7/007194; Y02T 10/70; Y02T 10/7072
USPC .......................................................... 320/104
See application file for complete search history.

(56) References Cited

U.S. PATENT DOCUMENTS

| | | | | |
|---|---|---|---|---|
| 6,330,909 | B1 * | 12/2001 | Takahashi | B60H 1/3216 62/133 |
| 8,251,169 | B2 * | 8/2012 | Fujiwara | H01M 10/6565 180/68.5 |
| 8,417,403 | B2 * | 4/2013 | Iida | H01M 10/63 903/903 |
| 11,038,222 | B2 * | 6/2021 | Fukada | B60L 58/26 |
| 11,186,186 | B2 * | 11/2021 | Hase | B60L 53/12 |
| 11,338,642 | B2 * | 5/2022 | Suzuki | B60H 1/3228 |
| 11,964,575 | B2 * | 4/2024 | Hase | B60L 53/12 |
| 12,344,075 | B2 * | 7/2025 | Makihara | H01M 10/615 |
| 2011/0278920 | A1 * | 11/2011 | Sakamoto | B60L 1/00 307/10.1 |
| 2015/0239405 | A1 | 8/2015 | Kaihara et al. | |
| 2016/0233563 | A1 * | 8/2016 | Oshima | H01M 10/6569 |
| 2019/0140327 | A1 * | 5/2019 | Fukada | H01M 50/24 |
| 2020/0023750 | A1 * | 1/2020 | Fukami | B60L 58/25 |

FOREIGN PATENT DOCUMENTS

| | | | | | |
|---|---|---|---|---|---|
| CN | 113043873 | A | * | 6/2021 | B60L 53/30 |
| JP | 2016-220310 | A | | 12/2016 | |
| JP | 2019160423 | A | * | 9/2019 | Y02T 90/16 |
| JP | 2019186977 | A | * | 10/2019 | Y02T 10/70 |
| JP | 2020-195253 | A | | 12/2020 | |
| JP | 2021138322 | A | * | 9/2021 | Y02T 10/62 |

* cited by examiner

GRID POWER
0
t1
t2
t3
TIME

TEMPERATURE
T1
t1
t2
t3
TIME

STORED POWER AMOUNT
C1
0
t1
t2
t3
TIME

GRID POWER
0
t11
t12
TIME

TEMPERATURE
T1
t11
t12
TIME

STORED POWER AMOUNT
C1
0
t11
t12
TIME

START
ACQUIRE CONNECTION TIMING
S01
DETERMINE START TIMING
S02
S03
IS CURRENT TIME START TIMING ?
NO
YES
S04
IS STORAGE BATTERY AT SUITABLE TEMPERATURE ?
YES
NO
S05
IS STORED POWER AMOUNT ≥ PREDETERMINED AMOUNT ?
NO
YES
S06
IS EFFECT OF SHORTENING TIME ACHIEVED ?
NO
YES
START INTERNAL TEMPERATURE ADJUSTMENT PROCESS
S07
END

STORED POWER AMOUNT
L1
L2
C11
C10
t21
t22
TIME

STORED POWER AMOUNT
L2
C11
L1
C10
t21
t22
TIME

START
S11
IS STORED POWER AMOUNT ≥ LOWER LIMIT VALUE ?
NO
YES
S12
IS SPEED OF TEMPERATURE CHANGE EQUAL TO OR GREATER THAN PREDETERMINED SPEED ?
NO
YES
S13
IS ELAPSED TIME ≤ UPPER LIMIT TIME ?
NO
YES
S14
INTERRUPT INTERNAL TEMPERATURE ADJUSTMENT PROCESS
END

FIG. 9

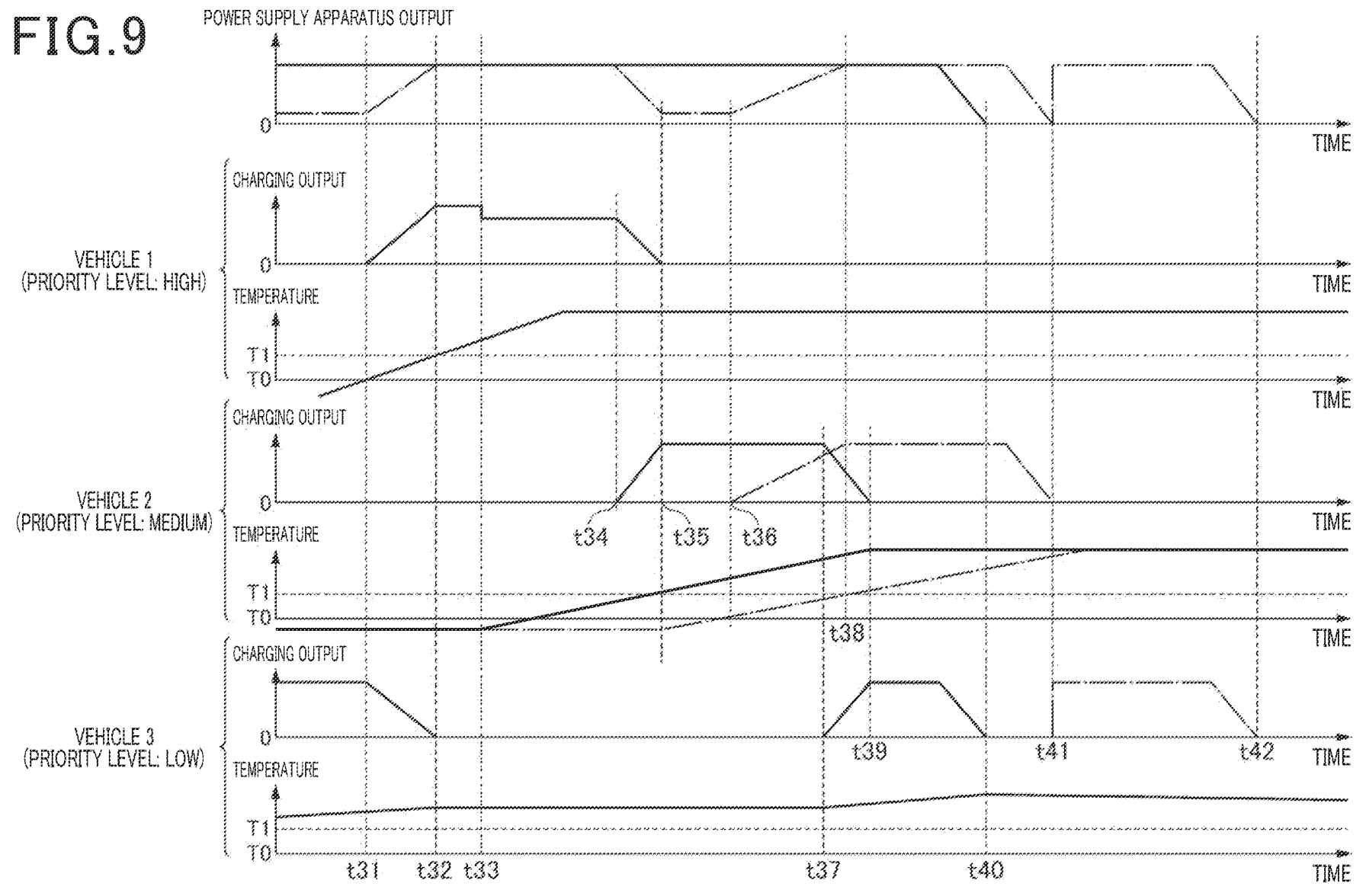

POWER SUPPLY APPARATUS OUTPUT
0
TIME

VEHICLE 1
(PRIORITY LEVEL: HIGH)
CHARGING OUTPUT
0
TIME
TEMPERATURE
T1
T0
TIME

VEHICLE 2
(PRIORITY LEVEL: MEDIUM)
CHARGING OUTPUT
0
TIME
TEMPERATURE
T1
T0
TIME

VEHICLE 3
(PRIORITY LEVEL: LOW)
CHARGING OUTPUT
0
TIME
TEMPERATURE
T1
T0
TIME t31 t32 t33 t34 t35 t36 t37 t38 t39 t40 t41 t42

POWER SUPPLY APPARATUS OUTPUT
0
TIME
VEHICLE 1
(PRIORITY LEVEL: HIGH)
CHARGING OUTPUT
0
TIME
TEMPERATURE
T1
T0
TIME
VEHICLE 2
(PRIORITY LEVEL: MEDIUM)
CHARGING OUTPUT
0
TIME
TEMPERATURE
T1
T0
TIME
t52
t53
t54
t55
t56
VEHICLE 3
(PRIORITY LEVEL: LOW)
CHARGING OUTPUT
0
TIME
t59
TEMPERATURE
T1
T0
TIME
t51
t57
t58
t60

POWER SUPPLY APPARATUS OUTPUT
VEHICLE 1 (PRIORITY LEVEL: HIGH)
VEHICLE 2 (PRIORITY LEVEL: MEDIUM)
VEHICLE 3 (PRIORITY LEVEL: LOW)
CHARGING OUTPUT
TEMPERATURE
T1
T0
0
TIME
t71
t72
t73
t74
t75
t76
t77
t78
t79
t80
t81
t82

CONTROL APPARATUS

CROSS-REFERENCE TO RELATED APPLICATIONS

This application is based on and claims the benefit of priority from Japanese Patent Application No. 2022-010300, filed on Jan. 26, 2022. The entire disclosure of the above application is incorporated herein by reference.

BACKGROUND

Technical Field

The present disclosure relates to a control apparatus for a vehicle.

Related Art

A vehicle that travels by driving force from a rotating electric machine includes a storage battery for storing electric power that is required for traveling. For example, charging of the storage battery may be performed through a cable in a state in which an external power supply apparatus and the vehicle are connected by the cable.

SUMMARY

One aspect of the present disclosure provides a control apparatus for a vehicle. The vehicle to be controlled includes a storage battery that stores therein electric power that is supplied from an external power supply apparatus and a rotating electric machine that is driven by electric power from the storage battery. The control apparatus adjusts a temperature of the storage battery and performs an internal temperature adjustment process that is a process for adjusting the temperature of the storage battery using energy other than the electric power supplied from the power supply apparatus.

BRIEF DESCRIPTION OF THE DRAWINGS

In the accompanying drawings:

FIG. 9 is a graph illustrating an example of changes over time in charging power and the like of each vehicle when a plurality of vehicles are charged;

DESCRIPTION OF THE EMBODIMENTS

Figure 1:
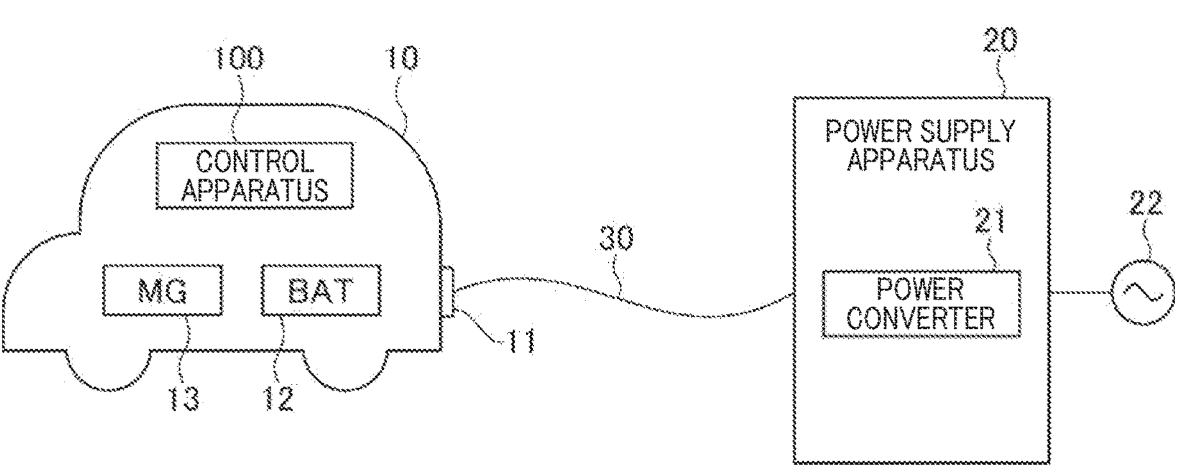
FIG. 1 is a diagram schematically illustrating a state in which an electric vehicle and a power supply apparatus are connected by a cable.

When charging is performed in a state in which a temperature of the storage battery is too low, in addition to charging at a sufficient speed becoming difficult, the storage battery may deteriorate. This also similarly applies when charging is performed in a state in which the temperature of the storage battery is too high. In this case as well, the storage battery may deteriorate. Therefore, as described in JP-A-2020-195253, during charging, the storage battery being heated using electric power that is supplied from a power supply apparatus and the temperature of the storage battery being set to a temperature that is suitable for charging is performed as required.

In conventional technology such as that described in JP-A-2020-195253, above, a control apparatus starts heating the storage battery using electric power that is supplied from a cable, after the power supply apparatus and the vehicle are connected by the cable. Subsequently, during a period until the temperature of the storage battery increases and becomes a suitable temperature, charging of the storage battery cannot be performed at a sufficient speed.

For example, at a facility in which the power supply apparatus is set, when numerous vehicles are awaiting their turn for charging, each vehicle may start heating the storage battery after being connected to the cable and charging may be started after the storage battery reaches a suitable temperature. Therefore, an amount of time during which each vehicle is connected to the cable is long. Wait times of subsequent vehicles also become long. In addition, while a vehicle is stopped and awaiting its turn, the storage battery of the vehicle further cools. Therefore, an amount of time required to heat the storage battery becomes even longer. When a business operator who owns numerous electric vehicles as rental vehicles attempts to charge all of the vehicles within a limited amount of time until a time at which service is started, issues similar to that above arise.

It is thus desired to shorten an amount of time required until completion of charging.

A first exemplary embodiment of the present disclosure provides a control apparatus for a vehicle. The vehicle to be controlled includes a storage battery that stores therein electric power that is supplied from an external power supply apparatus and a rotating electric machine that is driven by electric power from the storage battery. The control apparatus includes a temperature adjusting unit that adjusts a temperature of the storage battery. The temperature adjusting unit performs an internal temperature adjustment process that is a process for adjusting the temperature of the storage battery using energy other than the electric power supplied from the power supply apparatus.

A second exemplary embodiment of the present disclosure may provide a control system for a vehicle. The vehicle includes: a storage battery that stores therein electric power that is supplied from an external power supply apparatus; and a rotating electric machine that is driven by electric power from the storage battery. The control system includes:

a processor; a non-transitory computer-readable storage medium; a set of computer-executable instructions stored in the computer-readable storage medium that, when read and executed by the processor, cause the processor to implement: adjusting a temperature of the storage battery; and performing an internal temperature adjustment process that is a process for adjusting the temperature of the storage battery using energy other than the electric power supplied from the power supply apparatus.

A third exemplary embodiment of the present disclosure may provide a control method for a vehicle. The vehicle includes: a storage battery that stores therein electric power that is supplied from an external power supply apparatus; and a rotating electric machine that is driven by electric power from the storage battery. The control method includes: adjusting a temperature of the storage battery; and performing an internal temperature adjustment process that is a process for adjusting the temperature of the storage battery using energy other than the electric power supplied from the power supply apparatus.

According to the exemplary embodiments described above, a temperature of a storage battery can be adjusted and the storage battery can set to a suitable temperature by performing an internal temperature adjustment process. The internal temperature adjustment process is a process for adjusting the temperature of the storage battery using energy (such as energy of electric power stored in the storage battery) other than electric power supplied from a power supply apparatus. Therefore, the internal temperature adjustment process can be performed even when the vehicle and the power supply apparatus are not connected by a cable. For example, if the internal temperature adjustment process is performed from a timing before the cable is connected to the vehicle, charging can be performed at a sufficient speed immediately after the cable is connected to the vehicle. Consequently, an amount of time required from cable connection to completion of charging can be shortened compared to that in the past.

According to the present exemplary embodiments, an amount of time required until completion of charging can be shortened.

Some embodiments will hereinafter be described with reference to the accompanying drawings. To facilitate understanding of the descriptions, identical constituent elements in the drawings are given the same reference numbers when possible. Redundant descriptions are omitted.

A control apparatus 100 according to the present embodiment is mounted in the vehicle 10. The control apparatus 100 is configured as an apparatus for controlling charging of a storage battery 12 of the vehicle 10.

The vehicle 10 to be controlled is configured as an electric vehicle that includes the storage battery 12 and a rotating electric machine. The storage battery 12 stores therein electric power that is required for traveling of the vehicle 10. For example, the storage battery 12 may be a lithium-ion battery. The rotating electric machine 13 is an apparatus that generates driving force that is required for traveling of the vehicle 10. The rotating electric machine 13 is also referred to as a "motor generator." The rotating electric machine 13 is driven by electric power supplied from the storage battery 12.

Here, the vehicle 10 may be an electric vehicle that travels by only the driving force from the rotating electric machine 13. However, the vehicle 10 may also be a hybrid vehicle that travels by driving force from both an internal combustion engine and the rotating electric machine 13.

Electric power that is supplied from an external power supply apparatus 20 is stored in the storage battery 12 in advance. As shown in FIG. 1, charging of the storage battery 12 is performed in a state in which the vehicle 10 and the power supply apparatus 20 are connected by a cable 30. The cable 30 extends from the power supply apparatus 20 and a tip end thereof is connected to a power supply port 11 that is provided in the vehicle 10.

For example, the power supply apparatus 20 may be charging equipment that is erected outdoors. Electric power (hereinafter referred to as "grid power") is supplied from an electrical grid 22 to the power supply apparatus 20. The power supply apparatus 20 includes a power converter 21. For example, the power converter 21 may be a combination of an inverter and a direct current-to-direct current (DC/DC) converter. The power converter 21 converts the grid power that is alternating-current power to direct-current power of a predetermined voltage. The direct-current power after being converted by the power converter 21 is supplied to the vehicle 10 through the cable 30 and charges the storage battery 12. Here, conversion from the alternating-current power to the direct-current power may be performed on the vehicle 10 side rather than the power supply apparatus 20 side.

Figure 2:
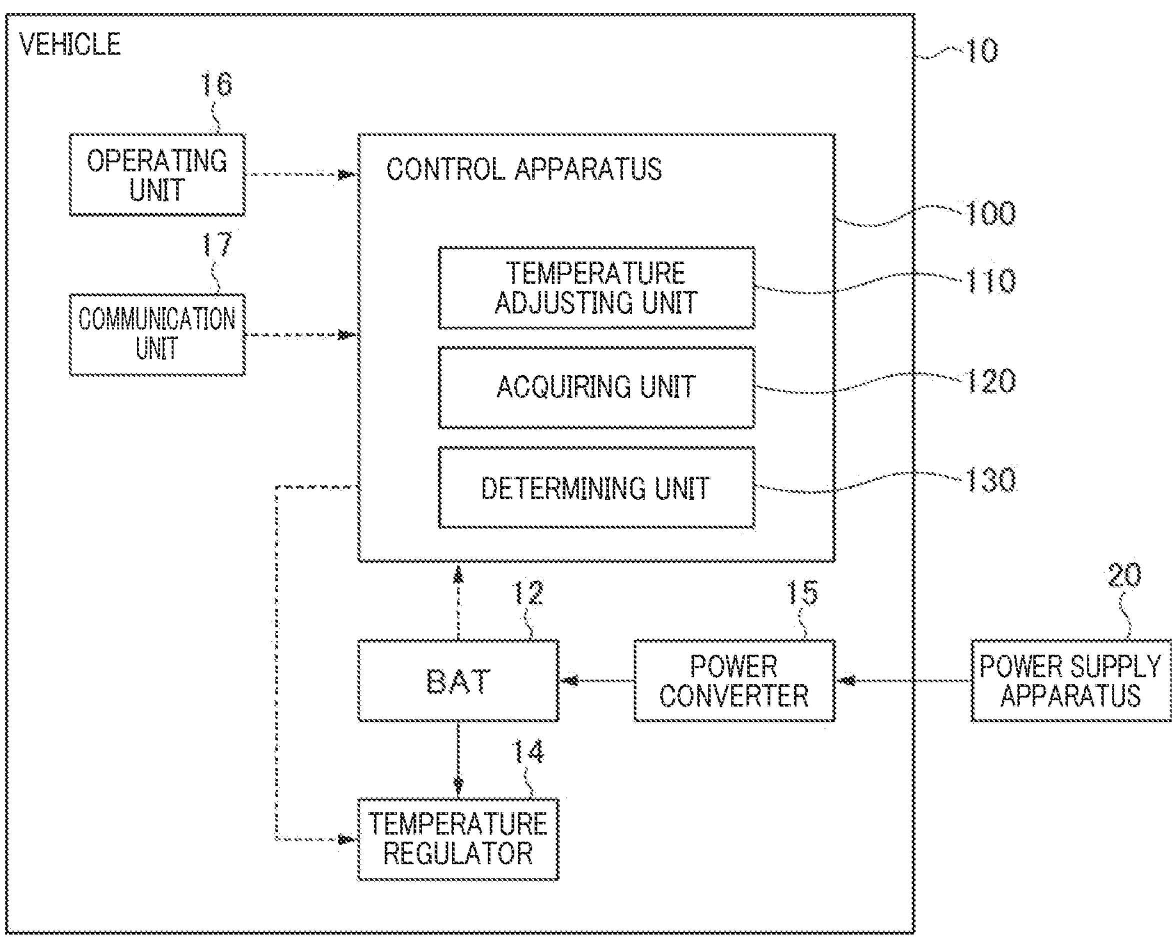
FIG. 2 is a diagram schematically illustrating a configuration of a vehicle including a control apparatus according to a present embodiment.

FIG. 2 schematically shows a configuration of the control apparatus 100 and the vehicle 10 that includes the control apparatus 100. Here, illustration of the rotating electric machine 13 is omitted in FIG. 2.

First, a configuration of the vehicle 10 will be described. The vehicle 10 includes, in addition to the storage battery 12 and the rotating electric machine 13 described above, a temperature regulator 14, a power converter 15, an operating unit 16, and a communication unit 17.

The temperature regulator 14 is an apparatus for adjusting a temperature of the storage battery 12 to a suitable temperature. The "suitable temperature" herein refers to a temperature that is within a predetermined range that is suitable for charging and discharging the storage battery 12. The temperature regulator 14 according to the present embodiment is an electric heater that is operated using electric power stored in the storage battery 12 and is provided in a position near the storage battery 12. The temperature regulator 14 may be an apparatus that heats the storage battery 12 as according to the present embodiment. However, the temperature regulator 14 may also be an apparatus that cools the storage battery 12 by electric power from the storage battery 12, such as a Peltier element. Moreover, the temperature regulator 14 may be an apparatus that can perform both heating and cooling of the storage battery 12. The control apparatus 100 controls operation of the temperature regulator 14.

The temperature regulator 14 may be operated using the electric power that is stored in the storage battery 12 as according to the present embodiment. However, the temperature regulator 14 may use energy other than the electric power stored in the storage battery 12. For example, when an internal combustion engine is provided in the vehicle 10, the temperature regulator 14 may be an apparatus that heats the storage battery 12 using heat that is generated in the internal combustion engine. Specifically, the temperature regulator 14 may be an apparatus that circulates a fluid between the internal combustion engine and the storage battery 12, thereby adjusting the temperature of the storage battery 12. In any case, the temperature regulator 14 is capable of adjusting the temperature of the storage battery 12 using energy other than the electric power that is supplied from the power supply apparatus 20.

Here, in the state in which the vehicle 10 and the power supply apparatus 20 are connected by the cable 30, the temperature regulator 14 can also be operated by the electric power that is supplied from the power supply apparatus 20. In addition, the temperature regulator 14 can be operated using both the electric power that is supplied from the storage battery 12 and the electric power that is supplied from the power supply apparatus 29 at a predetermined ratio.

The power converter 15 is an apparatus that converts the electric power that is supplied through the cable 30 from the power supply apparatus 20, supplies the converted electric power to the storage battery 12, and charges the storage battery 12. The control apparatus 100 controls operation of the power converter 15. As a result, a magnitude of electric power by which the storage battery 12 is charged is adjusted. Here, the power converter 15 can also supply the converted electric power to the temperature regulator 14. A configuration in which a dedicated power converter for supplying electric power to the temperature regulator 14 is provided separately from the power converter 15 is also possible.

In cases in which direct-current power is supplied from the power supply apparatus 20 as according to the present embodiment, a DC/DC converter can be used as the power converter 15. In cases in which alternating-current power is supplied from the power supply apparatus 20, an inverter can be used as the power converter 15. Here, when the electric power after conversion by the power converter 21 of the power supply apparatus 20 can be directly supplied to the storage battery 12, the power converter 15 may not be provided. In this case, the magnitude of electric power by which the storage battery 12 is charged is adjusted by only control on the power supply apparatus 20 side. The power supply apparatus 20 reads information on the vehicle 10 side, specifically information on an allowable current, voltage, and the like of the storage battery 12, by communication, and controls the magnitude of electric power supplied to the vehicle 10 based on the information.

The operating unit 16 receives an operation that is performed by an occupant (such as a driver) of the vehicle 10. For example, a touch panel that is provided in a vehicle cabin of the vehicle 10 may be used as the operating unit 16. Content of the operation performed on the operating unit 16 is transmitted to the control apparatus 100. The occupant can adjust aspects of control performed by the control apparatus 100 by operating the operating unit 16. Parameters that are set by the operation on the operating unit 16 will be described hereafter.

The communication unit 17 is an apparatus for performing wireless communication between the control apparatus 100 and the outside. The communication unit 17 may be a mobile communication terminal belonging to the occupant of the vehicle 10. The communication unit 17 acquires parameters that are required for control performed by the control apparatus 100, through wireless communication with a server that is set outside the vehicle 10. The parameters that are acquired by the communication unit 17 will be described hereafter.

The configuration of the control apparatus 100 will further be described with reference to FIG. 2. The control apparatus 100 is configured as a computer system that includes a central processing unit (CPU), a read-only memory (ROM), a random access memory (RAM), and the like. As described above, the control apparatus 100 is mounted to the vehicle 10. Here, the control apparatus 100 may be configured as a single apparatus as according to the present embodiment. However, the control apparatus 100 may also be configured as a plurality of apparatuses that perform bidirectional communication therebetween. In addition, a configuration in which functions of the control apparatus 100 described hereafter are partially or entirely implemented by an apparatus that is set in a position differing from that of the vehicle 10 is also possible.

The control apparatus 100 includes, as block elements that indicate the functions thereof, a temperature adjusting unit 110, an acquiring unit 120, and a determining unit 130.

The temperature adjusting unit 110 performs processes to adjust the temperature of the storage battery 12. The temperature adjusting unit 110 controls the operation of the temperature regulator 14 described above, thereby adjusting the temperature of the storage battery 12. At this time, the temperature adjusting unit 110 can also adjust a ratio of the electric power that is respectively supplied to the temperature regulator 14 from the storage battery 12 and the power supply apparatus 20.

Of the processes performed by the temperature adjusting unit 110, a process for adjusting the temperature of the storage battery 12 using energy (electric power energy from the storage battery 12, according to the present embodiment) other than the electric power supplied from the power supply apparatus 20 is also particularly referred to, hereafter, as an "internal temperature adjustment process." The temperature adjusting unit 110 can perform the internal temperature adjustment process in a state in which the power supply apparatus 20 is not supplying electric power. In addition, the temperature adjusting unit 110 can also perform a process for heating the storage battery 12 by the electric power supplied from the power supply apparatus 20. Furthermore, the temperature adjusting unit 110 can also perform the internal temperature adjustment process in parallel with the process for heating the storage battery 12 by the electric power supplied from the power supply apparatus 20.

The acquiring unit 120 performs a process to acquire a connection timing of the vehicle 10 and the power supply apparatus 20. The "connection timing" refers to a timing at which the vehicle 10 arrives at a position of the power supply apparatus 20, and the vehicle 10 and the power supply apparatus 20 are connected by the cable 30. Content of a specific process that is performed by the acquiring unit 120 to acquire the connection timing will be described hereafter.

The determining unit 130 performs a process to determine a start timing of the internal temperature adjustment process. The temperature adjusting unit 110, described above, starts the internal temperature adjustment process at the start timing determined by the determining unit 130 in advance. Content of a specific process that is performed by the determining unit 130 to determine the start timing will be described hereafter.

Here, for example, in a storage battery such as the lithium-ion battery, charging and discharging performance is commonly known to change depending on temperature. For example, when charging is performed in a state in which the temperature of the storage battery 12 is too low, charging at a sufficient speed becomes difficult. In addition, the storage battery 12 may deteriorate. This similarly applies when charging is performed in a state in which the temperature of the storage battery 12 is too high. In this case as well, the storage battery 12 may deteriorate. Therefore, during charging, the temperature of the storage battery 12 is required to be set to a temperature that is suitable for charging, such as by the storage battery 12 being heated in advance.

Figures 3A, 3B, 3C:
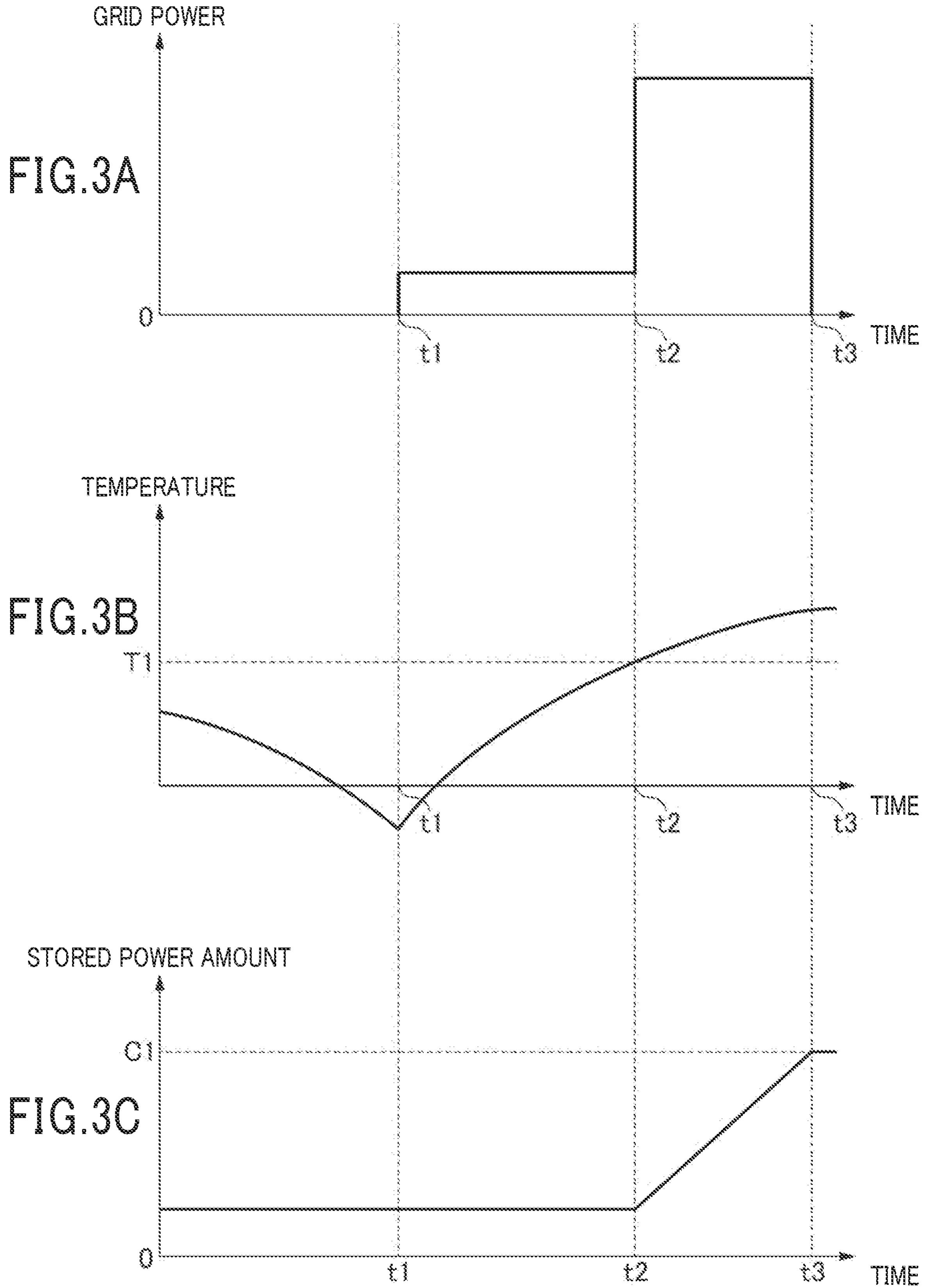
FIG. 3A to FIG. 3C are graphs for explaining an overview of control performed by a control apparatus of a comparative example.

A conventional method (comparative example) for heating the storage battery 12 will be described with reference to FIG. 3A to FIG. 3C. FIG. 3A to FIG. 3C show an example of changes over time in parameters when the storage battery 12 is charged by control according to the comparative example. FIG. 3A shows the changes over time in the grid power that is supplied from the power supply apparatus 20 to the vehicle 10. FIG. 3B shows the changes over time in the temperature of the storage battery 12. FIG. 3C shows the changes over time in a stored power amount of the storage battery 12. The "stored power amount" is an amount of electric power stored in the storage battery 12 or an indicator that indicates the amount of electric power stored in the storage battery 12. The stored power amount is also referred to as a so-called state-of-charge (SOC).

In the comparative example, at time t1, the vehicle 10 and the power supply apparatus 20 are in a state of being connected by the cable 30. A period until time t1 is a period during which the vehicle 10 is stopped near the power supply apparatus 20 and awaiting its turn for charging. Therefore, during this period, the temperature of the storage battery 12 decreases with the elapse of time (FIG. 3B). In addition, the grid power that is supplied to the vehicle 10 during this period is 0, and the stored power amount of the storage battery 12 does not change (FIG. 3C).

T1 shown in FIG. 3B is a temperature that indicates a lower limit of a range that is set in advance as a temperature range over which the storage battery 12 is able to sufficiently exhibit charging and discharging performance thereof. At time t1 when the cable 30 is connected to the vehicle 10, the temperature of the storage battery 12 is below T1. Therefore, charging cannot be started at this time. As a result, a process to heat the storage battery 12 using the grid power is started from time t1. That is, the temperature regulator 14 is operated by the grid power that is supplied from the cable 30 and the process to heat the storage battery 12 is started. As a result, at time t1 and subsequent thereto, the temperature of the storage battery 12 gradually increases (FIG. 3B). The grid power that is supplied from the cable 30 is not used to charge the storage battery 12. Therefore, the stored power amount of the storage battery 12 does not change even at time t1 and subsequent thereto (FIG. 3C).

When the temperature of the storage battery 12 reaches T1 at time t2, the storage battery 12 is subsequently in a state in which the charging and discharging performance thereof can be sufficiently exhibited. Therefore, charging of the storage battery 12 is started from time t2. The grid power that is supplied to the vehicle 10 through the cable 30 increases. All of the grid power is supplied to the storage battery 12 and the storage battery 12 is charged (FIG. 3A). In addition, the stored power amount of the storage battery 12 increases with the elapse of time (FIG. 3C). The charging of the storage battery 12 is performed until the stored power amount of the storage battery 12 reaches a predetermined target value C1. Here, at time t2 and subsequent thereto, only a portion, rather than all, of the grid power supplied to the vehicle 20 through the cable 30 may be supplied to the storage battery 12. The remaining grid power may be used to continue operation of the temperature regulator 14.

In this manner, in the comparative example, after the power supply apparatus 20 and the vehicle 10 are connected by the cable 30, the heating of the storage battery 12 using the grid power supplied from the cable 30 is started. During the period in which the temperature of the storage battery 12 is not a suitable temperature, that is, during the period from time t1 to time t2, charging of the storage battery 12 cannot be performed regardless of the cable 30 being connected to the vehicle 10. Therefore, a period from time t1 when the cable 30 is connected to the vehicle 10 to time t3 when the charging is completed is relatively long.

An overview of processes performed by the control apparatus 100 according to the present embodiment will be described with reference to FIG. 4. Items in the graphs in FIG. 4 are identical to the items in the graphs in FIG. 3.

In a manner similar to that in the example in FIG. 3, in the example in FIG. 4, the vehicle 10 and the power supply apparatus 20 are in a state of being connected by the cable 30 at time W. A period until time t11 is a period during which the vehicle 10 is stopped near the power supply apparatus 20 and awaiting its turn for charging.

The control apparatus 100 according to the present embodiment performs the internal temperature adjustment process during the period until time t11 when the cable 30 is connected to the vehicle 10. As described above, the "internal temperature adjustment process" according to the present embodiment is a process in which the temperature regulator 14 is operated by the electric power that is stored in the storage battery 12 and the temperature of the storage battery 12 is thereby set to a suitable temperature in advance. As a result of the internal temperature adjustment process, the temperature of the storage battery 12 increases and exceeds T1 before time W. Therefore, when the power supply apparatus 20 and the vehicle 10 are connected by the cable 30, charging can be immediately started from this time (time t11).

Figures 4A, 4B, 4C:
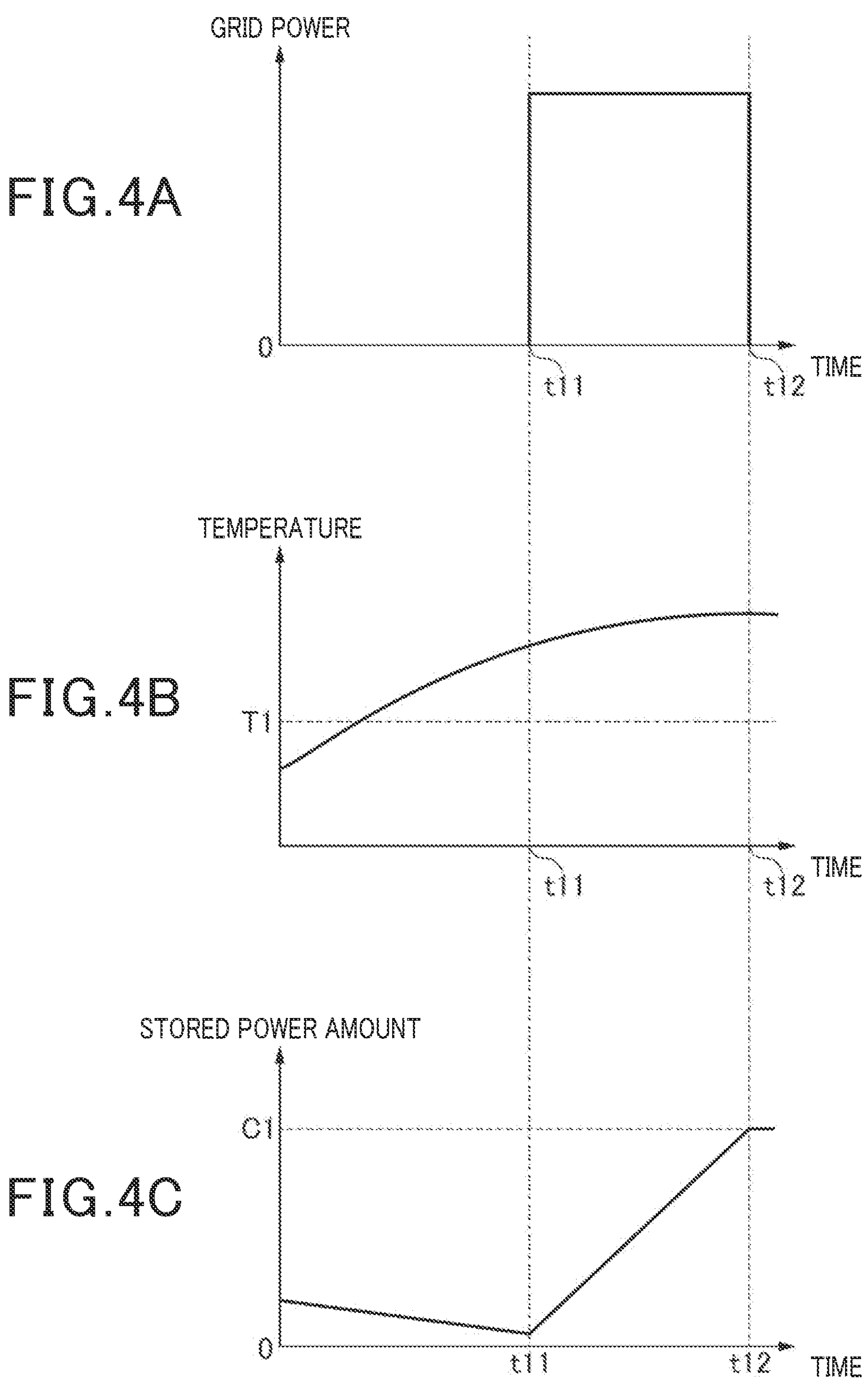
FIG. 4A to FIG. 4C are graphs for explaining an overview of control performed by the control apparatus according to the present embodiment.

Here, in the example in FIG. 4, during the period until time t11, the stored power amount gradually decreases as a result of the internal temperature adjustment process (FIG. 4C). As a result, an amount of electric power by which the storage battery 12 is to be charged is greater than that in the example in FIG. 3. A period required from the start to end of charging is slightly longer than that in the example in FIG. 3 (a period from time t2 to time t3). However, a period from when the cable 30 is connected to the vehicle 10 until the charging is completed is shorter than that in the example in FIG. 3 (a period from time t1 to time t3).

In this manner, the control apparatus 100 according to the present embodiment is capable of shortening an amount of time required from cable connection to completion of charging compared to that in the past, by performing the internal temperature adjustment process before the connection of the cable 30.

Figure 5:
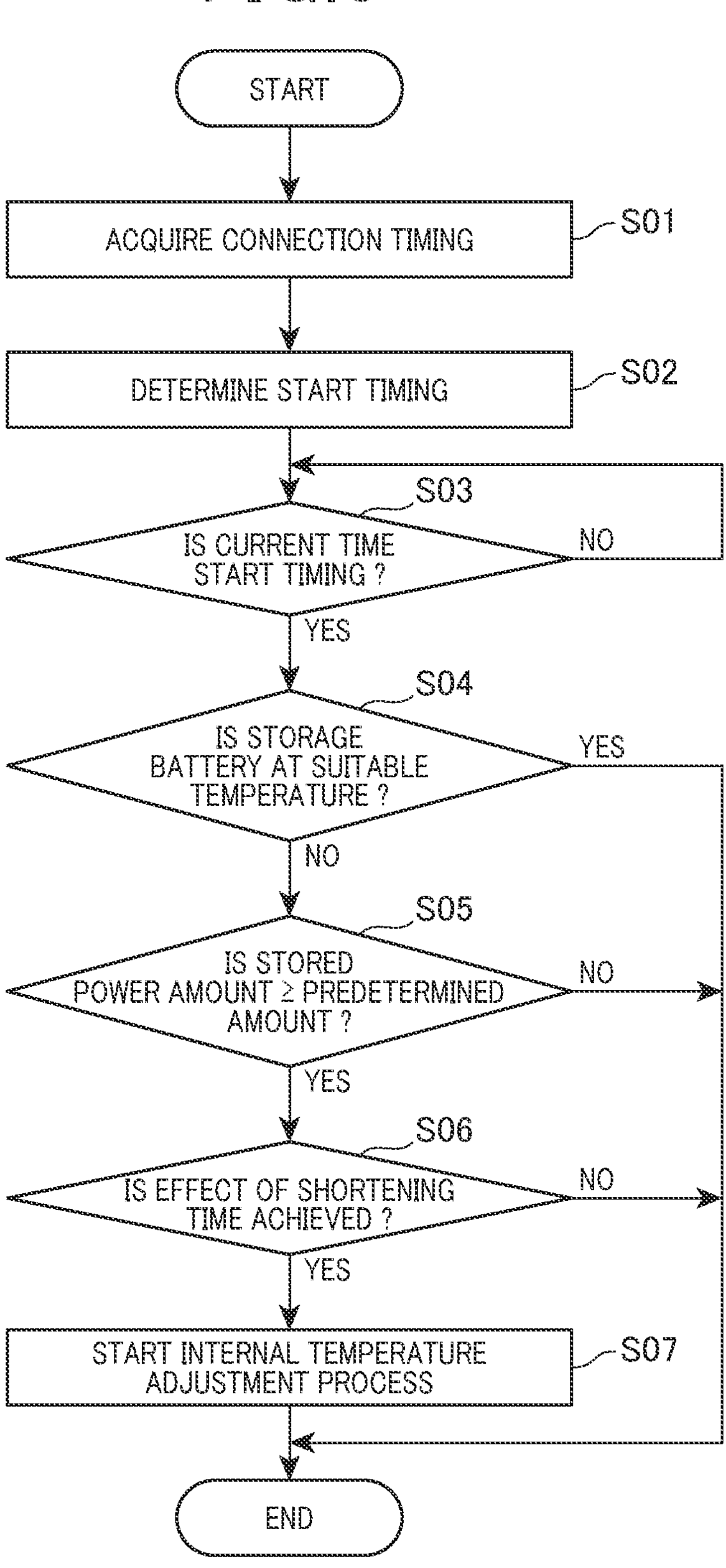
FIG. 5 is a flowchart illustrating a flow of processes performed by the control apparatus according to the present embodiment.

A flow of specific processes performed by the control apparatus 100 to actualize control such as the foregoing will be described with reference to FIG. 5. A series of processes shown in FIG. 5 is started at a predetermined timing during the period in which the cable 30 is not connected to the vehicle 10.

At an initial step S01, the acquiring unit 120 performs a process to acquire the "connection timing" that is the timing at which the vehicle 10 and the power supply apparatus 20 are connected by the cable 30.

For example, when the vehicle 10 is traveling towards a location of the power supply apparatus 20, the acquiring unit 120 may acquire the connection timing by predicting an arrival time based on a distance from a current location of the vehicle 10 to the power supply apparatus 20 and a traveling speed of the vehicle 10. In addition, the acquiring unit 120 may acquire the number of vehicles awaiting charging at the power supply apparatus 20 through communication, and acquire a time that is obtained by adding a wait time after arrival to the predicted arrival time as the connection timing.

In this manner, the acquiring unit 120 acquires the connection timing by prediction based on information acquired from the outside. The "information acquired from the outside" refers to a current position of the vehicle 10, the number of vehicles awaiting charging at the power supply apparatus 20, and the like, but may also be other types of information.

Instead of a configuration such as this, for example, the occupant may operate the operating unit 16 and directly input a time that serves as the connection timing. In this case, the acquiring unit 120 acquires the inputted time as is, as the connection timing. In addition, the acquiring unit 120 may acquire a time that is inputted from an external server as is, as the connection timing. For example, the "external server" may be a server that externally manages automated traveling of the vehicle 10. In this manner, the acquiring unit 120 may acquire the connection timing by input from the occupant or the outside (rather than by performing prediction).

At step S02 following step S01, the determining unit 130 performs a process to determine the "start timing" of the internal temperature adjustment process.

The determining unit 130 calculates an amount of time required for the internal temperature adjustment process, based on a current temperature of the storage battery 12, a current outside temperature, performance of the temperature regulator 14, and the like. Subsequently, the determining unit 130 determines, as the start timing, a time that is before the connection timing by the required amount of time. The "amount of time required for the internal temperature adjustment process" is an amount of time that is required for the temperature of the storage apparatus 12 to reach a predetermined target temperature (such as T1 in FIG. 4B).

Here, for example, the current temperature of the storage battery 12 may be acquired by a temperature sensor (not shown) that is provided in the storage battery 12. The "performance of the temperature regulator 14" is an indicator that indicates an extent to which the temperature regulator 14 is able to change the temperature of the storage battery 12 per unit time, and is a parameter that is calculated in advance.

In this manner, the determining unit 130 determines the start timing as the timing that is before the connection timing by a predetermined amount of time. The "predetermined amount of time" is the amount of time required for the internal temperature adjustment process, as described above, and is calculated each time. However, the predetermined amount of time may be an amount of time of a fixed length that is set in advance.

Instead of a configuration such as this, for example, the occupant may operate the operating unit 16 and directly input a time that serves as the start timing. In this case, the determining unit 130 determines the inputted time as is to be the start timing. In addition, the determining unit 130 may determine a time that is inputted from an external server as is to be the start timing. For example, the "external server" may be a server that manages automated traveling of the vehicle 10 from the outside. In this manner, the determining unit 130 may determine the start timing based on input from the occupant or the outside, without taking into consideration the connection timing.

At step S03 following step S02, the control apparatus 100 determines whether a current time is the start timing. When determined that the current time is still before the start timing, the control apparatus 100 repeatedly performs the process at step S03. When determined that the current time is the start timing or subsequent thereto, the control apparatus 100 proceeds to step S04.

At step S04, the control apparatus 100 determines whether the temperature of the storage battery 12 is a suitable temperature. When determined that the temperature of the storage battery 12 is within the predetermined temperature range that is suitable for charging, the control apparatus 100 ends the process shown in FIG. 5 without performing the internal temperature adjustment process. When determined that the temperature of the storage battery 12 is below a lower limit of the temperature range or exceeds an upper limit of the temperature range, the control apparatus 100 proceeds to step S05.

In this manner, the temperature adjusting unit 110 is configured to perform the internal temperature adjustment process when the temperature of the storage battery 12 is outside the predetermined temperature range that is suitable for charging. As a result, a situation in which unnecessary internal temperature adjustment process is performed can be prevented.

At step S05, the control apparatus 100 determines whether the stored power amount of the storage battery 12 is equal to or greater than a predetermined amount. The "predetermined amount" is a lower limit value that is set in advance as an amount of electric power required for the internal temperature adjustment process. An amount that is obtained by a fixed margin being added to the amount of electric power required for the internal temperature adjustment process may be set as the above-described predetermined amount. The "amount of electric power required for the internal temperature adjustment process" used to calculate the above-described predetermined amount may be a value that is calculated each time based on the temperature of the storage battery 12 and the like. Alternatively, the "amount of electric power required for the internal temperature adjustment process" may be a fixed value. When determined that the stored power amount does not meet the predetermined amount, the control apparatus 100 ends the process shown in FIG. 5 without performing the internal temperature adjustment process. When determined that the stored power amount is equal to or greater than the predetermined amount, the control apparatus 10 proceeds to step S06.

In this manner, the temperature adjusting unit 110 is configured to perform the internal temperature adjustment process when the amount of electric power stored in the storage battery 12 is equal to or greater than the predetermined amount. As a result, a situation in which the stored power amount of the storage battery 12 becomes too low as a result of the internal temperature adjustment process being performed and the vehicle becomes unable to travel can be prevented.

At step S06, the control apparatus 100 determines whether an amount of time required from when the cable 30 is connected to the vehicle 10 until the charging is completed is shorted by the internal temperature adjustment process being performed. That is, the control apparatus 100 determines whether performing the internal temperature adjustment process is meaningful. This determination is performed by the temperature adjusting unit 110.

The temperature adjusting unit 110 performs the above-described determination based on expression (1), below.

(Target stored power amount−(current stored power amount−amount of electric power required for internal temperature adjustment process))/charging power<(target stored power amount−current stored power amount)/charging power+time required for temperature adjustment by grid power (1)

The "target stored power amount" in expression (1) is a target value of the stored power amount of the storage battery 12 and, for example, may be C1 in FIG. 3C. The "amount of electric power required for internal temperature adjustment process" is a predicted value of the amount of electric power required for the internal temperature adjustment process. The "charging power" is a maximum value of the electric power that can be supplied to the storage battery 12, that is, a maximum value of the amount of electric power with which the storage battery 12 can be charged per unit time. The "charging power" is determined by a state of the storage battery 12, performance of the power converter 15 on the vehicle 10 side, performance of the power converter 21 on the power supply apparatus 200 side, specifications of the cable 30, and the like. The "time required for temperature adjustment by grid power" refers to an amount of time required for the temperature of the storage battery 12 to reach the target temperature when the storage battery 12 is heated by the temperature regulator 14 being operated by the grid power supplied by the cable 30 as in the comparative example described with reference to FIG. 3.

A left side of expression (1) indicates the amount of time required from cable connection to completion of charging when the internal temperature adjustment process is performed. A right side of expression (1) indicates the amount of time required from cable connection to completion of charging when the internal temperature adjustment process is not performed. When the inequality in expression (1) is satisfied, that is, when the amount of time required when the internal temperature adjustment process is performed is shorter, the control apparatus 100 proceeds to step S07 in FIG. 5. Otherwise, the control apparatus 10 ends the process shown in FIG. 5 without performing the internal temperature adjustment process. At step S07, the control apparatus 100 starts the internal temperature adjustment process such as that described with reference to FIG. 4.

Figures 6A, 6B:
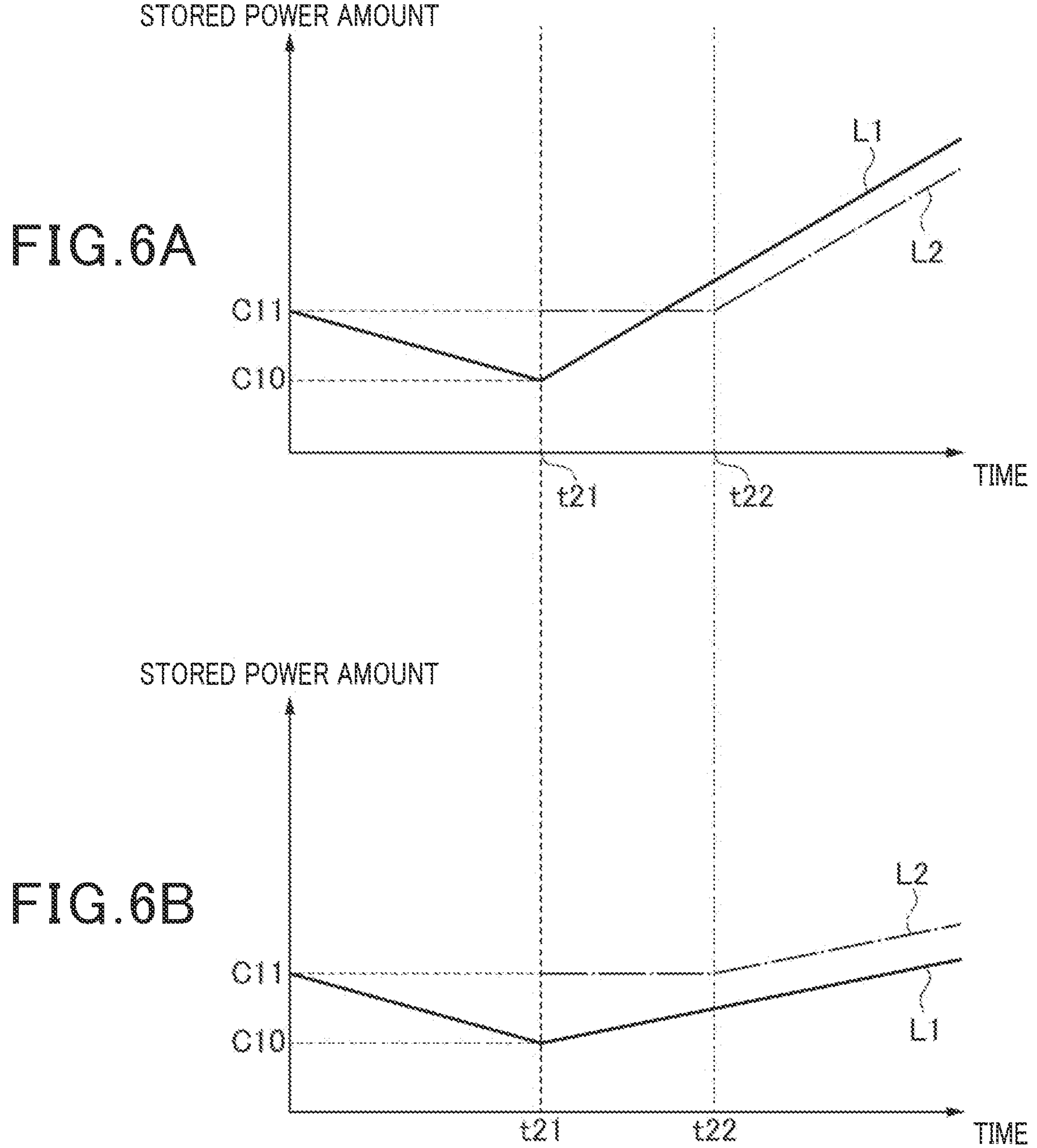
FIG. 6A and FIG. 6B are graphs illustrating examples of changes over time in a stored power amount when an internal temperature adjustment process is performed.

Line L1 in FIG. 6A indicates an example of changes over time in the stored power amount when the internal temperature adjustment process is performed. Line L2 in FIG. 6A indicates an example of changes over time in the stored power amount when the internal temperature adjustment process is not performed. Time t21 is a time at which the cable 30 is connected to the vehicle 10. Time t22 is a time at which heating of the storage battery 12 by the grid power is completed when the internal temperature adjustment process is not performed as indicated by line L2.

As in line L1 in FIG. 6A, when the internal temperature adjustment process is performed, the stored power amount of the storage battery 12 decreases from an initial C11 to C10 as a result of the internal temperature adjustment process. Subsequently, the stored power amount increases from time t21 in accompaniment with the start of charging. Meanwhile, as in line L2 in FIG. 6A, when the internal temperature adjustment process is not performed, the stored power amount of the storage battery 12 is maintained at the initial stored power amount C11 until time t22. Then, the stored power amount increases from time t22 in accompaniment with the start of charging. As is clear from a comparison between line L1 and line L2 at time t22 and subsequent thereto, in the example in FIG. 6A, the case in which the internal temperature adjustment process is performed (line L1) is greater in terms of the stored power amount. Therefore, when the internal temperature adjustment process is performed, the time until completion of charging can be shortened compared to when the internal temperature adjustment process is not performed. A reason for this is that the charging power in expression (1) is relatively large and a slope in the graph after the start of charging is large. FIG. 6A shows an example of when the temperature adjusting unit 110 makes a "Yes" determination at step S06 in FIG. 5.

FIG. 6B shows an example of when the charging power in expression (1) is relatively small and the slope in the graph after the start of charging is small. The example is shown by a method similar to that in FIG. 6A. In the example in FIG. 6B, in accompaniment with the slope in the graph after the start of charging being small, at time t22 and subsequent thereto, the case in which the internal temperature adjustment process is not performed (line L2) is greater in terms of the stored power amount. Therefore, when the internal temperature adjustment process is performed, the time until completion of charging instead increases compared to when the internal temperature adjustment process is not performed. FIG. 6B shows an example of when the temperature adjusting unit 110 makes a "No" determination at step S06 in FIG. 5.

In this manner, the temperature adjusting unit 110 is configured to determine whether to perform the internal temperature adjustment process based on both the predicted value of the amount of electric power required for the internal temperature adjustment process and the predicted value (the above-described "charging power") of the electric power that can be supplied from the power supply apparatus 20 to the storage battery 12. As a result, a situation in which the time until completion of charging increases as a result of the internal temperature adjustment process being performed can be prevented.

Figure 7:
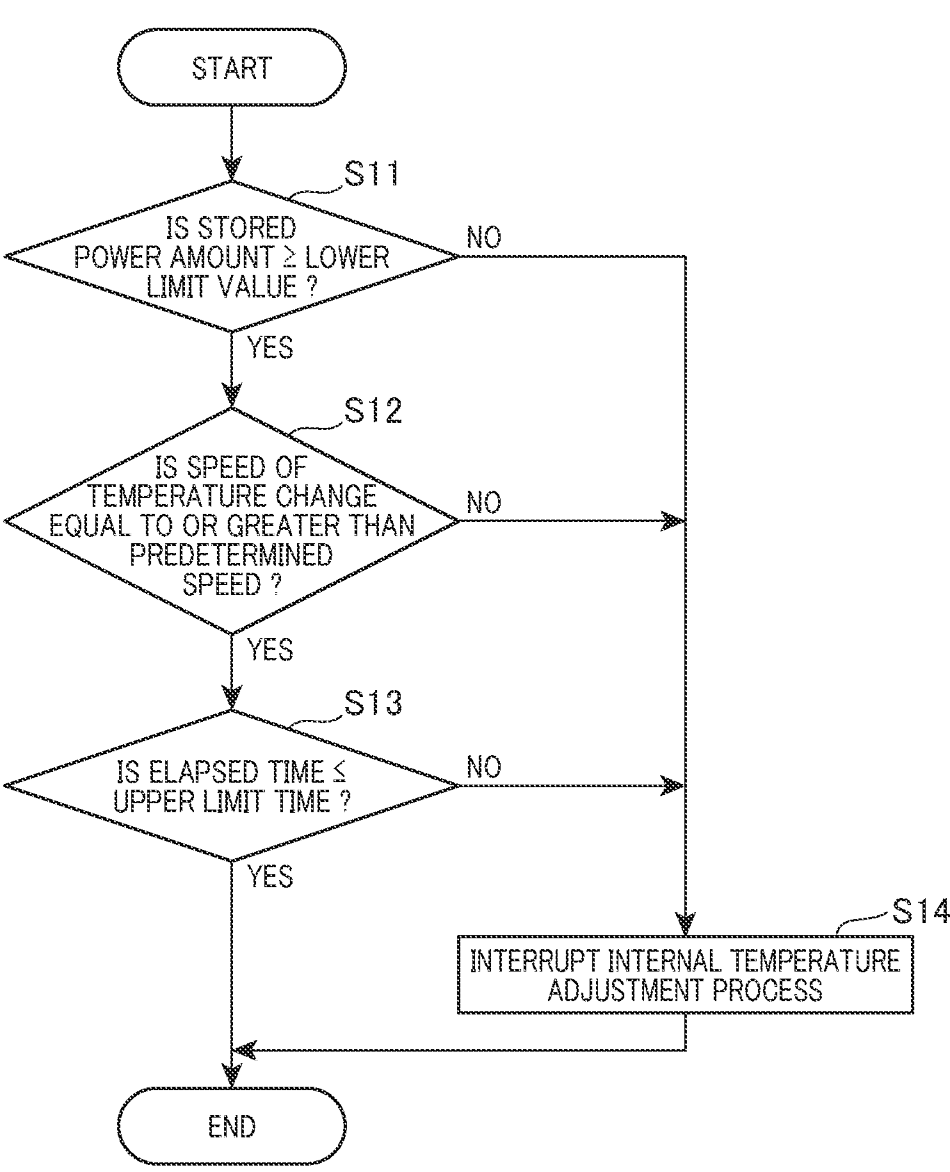
FIG. 7 is a flowchart illustrating a flow of processes performed by the control apparatus according to the present embodiment.

When the internal temperature adjustment process is started at step S07 in FIG. 5, the control apparatus 100 performs processes shown in FIG. 7 in parallel with the internal temperature adjustment process. A series of processes shown in FIG. 7 is repeatedly performed at each elapse of a predetermined cycle while the internal temperature adjustment process is being performed.

At initial step S11, the control apparatus 100 determines whether the stored power amount of the storage battery 12 is equal to or greater than a predetermined lower limit value. The "lower limit value" is set in advance as a value of the stored power amount that should be ensured at minimum to prevent a state in which the vehicle 10 is unable to travel. When determined that the stored power amount is below the lower limit value, the control apparatus 100 proceeds to step S14 described hereafter. Otherwise, the control apparatus 100 proceeds to step S12.

At step S12, the control apparatus 100 determines whether a speed of temperature change in the storage battery 12 is equal to or greater than a predetermined speed. The "predetermined speed" is set in advance as a lower limit value of the temperature change that can occur in the storage battery 12 when the internal temperature adjustment process is normally performed. When determined that the speed of temperature change in the storage battery 12 is less than the predetermined speed, the control apparatus 100 proceeds to step S14. Otherwise, the control apparatus 100 proceeds to step S13.

At step S13, the control apparatus 100 determines whether an elapsed time from the start of the internal temperature adjustment process to a current time is within a predetermined upper limit time. The "upper limit time" is set in advance as a maximum length of time required for the internal temperature adjustment process. When determined that the elapsed time exceeds the upper limit time, the control apparatus 100 proceeds to step S14. Otherwise, the control apparatus 100 temporarily ends the processes shown in FIG. 7 and continues the internal temperature adjustment process.

When determined that the stored power amount is below the lower limit value at step S11, the speed of temperature change in the storage battery 12 is less than the predetermined speed at step S12, or the elapsed time exceeds the upper limit time at step S13, the control apparatus 100 proceeds to step S14. At step S14, the control apparatus 100 performs a process to interrupt the internal temperature adjustment process. As a result, the internal temperature adjustment process being continued in a state in which the stored power amount is insufficient or in a state in which an issue of some sort has occurred in the storage battery 12, the temperature regulator 14, or the like can be prevented.

The determination at each step in FIG. 7 is performed by the temperature adjusting unit 110. In this manner, the temperature adjusting unit 110 performs the process to determine whether the internal temperature adjustment process can be continued while performing the internal temperature adjustment process.

As described above, the temperature adjusting unit 110 according to the present embodiment is configured to be capable of starting the internal temperature adjustment process before the vehicle 10 and the power supply apparatus 20 are connected to each other by the cable 30. Instead of a configuration such as this, the temperature adjusting unit 110 may start the internal temperature adjustment process after the vehicle 10 and the power supply apparatus 20 are connected to each other by the cable 30. In this case, the temperature regulator 14 may be simultaneously supplied both the electric power from the storage battery 12 and the electric power from the power supply apparatus 20. In other words, the internal temperature adjustment process may be performed in parallel with a process such as that described in the comparative example in FIG. 3A to FIG. 3C.

For example, in a case in which the electric power that can be outputted from the power supply apparatus 20 to the temperature regulator 14 is less than that which can ordinarily be outputted for reasons such as power supply being simultaneously performed for numerous vehicles at a power supply facility, the temperature of the storage battery 12 can be set to a suitable temperature in a shorter amount of time as a result of the internal temperature adjustment process being performed in parallel. In this case, a temperature increase speed of the storage battery 12 can be expected to become even faster because Joule heat is generated by internal resistance.

In this manner, the temperature adjusting unit 110 may adjust the temperature of the storage battery 12 using the electric power supplied from the power supply apparatus 20 as well, while performing the internal temperature adjustment process.

Figure 8:
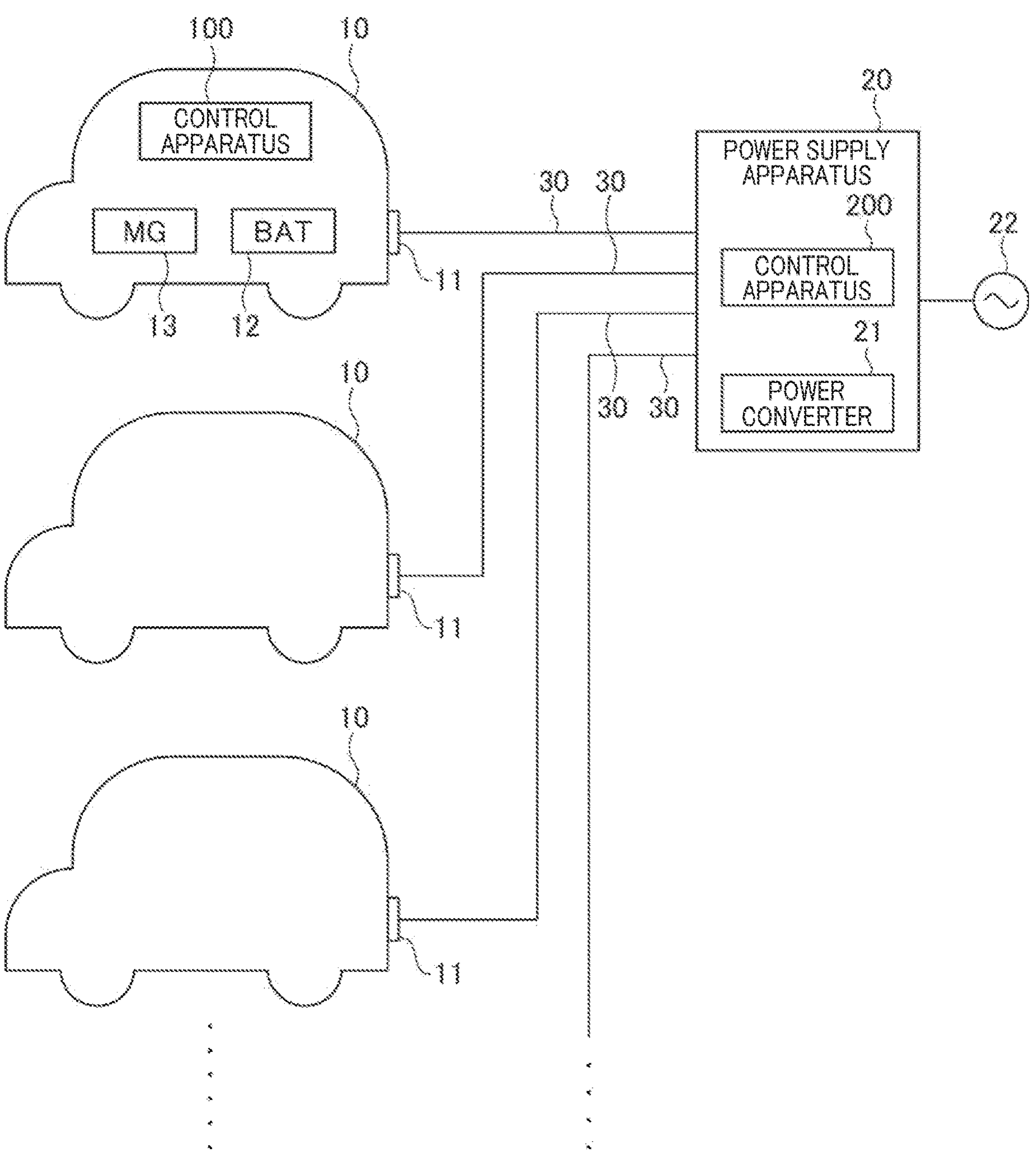
FIG. 8 is a diagram schematically illustrating a state in which a plurality of vehicles are connected to the power supply apparatus.

The power supply apparatus 20 may be configured to connect cables 30 to a plurality of vehicles as in FIG. 8 and be capable of performing power supply to the vehicles 10 in order. In an example shown in FIG. 8, a plurality of cables 30 extend from the power supply apparatus 20 and each cable 30 is connected to a power supply port 11 of a vehicle 10. The cable 30 may be configured such that a portion beyond the power supply apparatus 20 branches out into a plurality of portions, and each branching portion is connected to a vehicle 10. For example, at a basepoint (such as a car rental office or a logistics office) for a business that uses the plurality of vehicles 10, the plurality of vehicles 10 that are connected as in FIG. 8 may be charged in order during a time period such as nighttime. Here, a number of vehicles 10 that are simultaneously charged may be a single vehicle 10 or a plurality of vehicles 10.

In this example, a control apparatus 200 that is provided in the power supply apparatus 20 determines the order in which the vehicles 10 are charged and the like. The control apparatus 200 controls a timing at which charging is started in each vehicle 10, a timing at which temperature adjustment of the storage battery 12 is performed before charging, and the like while performing bidirectional communication with the control apparatus 100 of each vehicle 10. The control apparatus 200 such as this may be provided in a position differing from that of the power supply apparatus 200.

In this example, a voltage that is supplied from the power supply apparatus 20 to the storage battery 12 of each vehicle 10 can be individually adjusted for each vehicle 10. Such adjustment is performed by the power converter 15 that is provided in each vehicle 10. In addition, the power converter 21 may be individually provided in correspondence to each cable 30, and the above-described adjustment may be performed by each power converter 21. In this case, the power converter 15 may not be provided in the vehicle 10.

The control apparatus 200 sets a priority level for charging for each of the vehicles 10 that are connected. The control apparatus 200 starts charging in order from the vehicle 10 that has the highest priority level. For example, the priority level may be set based on a reservation status of the vehicle 10 or the like. For example, the priority level of the vehicle 10 may be set to be higher as an amount of time until a scheduled time of use of the vehicle 10 becomes shorter. In addition, the priority level may be set to be higher for a vehicle 10 that has a lower stored power amount in the storage battery 12. Conversely, the priority level may be set to be higher for a vehicle 10 that has a higher stored power amount in the storage battery 12. Moreover, a user who wishes to use the vehicle 10 may manually input a desired priority level upon reservation. Alternatively, a business operator who provides services may manually input the priority level.

A specific example of charging control based on priority levels performed by the control apparatus 200 will be described with reference to FIG. 9. An example of changes over time in the electric power outputted from the power supply apparatus 20 is shown in a topmost row in FIG. 9. Below the topmost row, an example of changes over time in the charging power supplied to the storage battery 12 (upper row) and an example of changes over time in the temperature of the storage battery 12 (lower row) are shown for each of three vehicles 10 that have differing priority levels.

Here, "vehicle 1" in FIG. 9 is a vehicle 10 of which the priority level is set to "high." "Vehicle 2" is a vehicle 10 of which the priority level is set to "medium." "Vehicle 3" is a vehicle 10 of which the priority level is set to "low." The vehicles 10 are also respectively referred to, hereafter, as "vehicle 1," "vehicle 2" and "vehicle 3."

Regarding each vehicle 10, T1 shown in a graph of the temperature changes in the storage battery 12 is a same temperature as T1 in FIG. 4 and the like. T1 is the temperature that indicates the lower limit of the range that is set in advance as the temperature range over which the storage battery 12 is able to sufficiently exhibit charging and discharging performance thereof. TO shown in the graph of the temperature changes in the storage battery 12 is a temperature that is lower than T1 and indicates a lower limit of a temperature range over which charging of the storage battery 12 can be performed. When the temperature of the storage battery 12 is below TO, the charging of the storage battery 12 cannot be performed. When the temperature of the storage battery 12 is within a range from T0 to T1, the charging of the storage battery 12 can be performed with a restriction on a magnitude of the electric power that is supplied to the storage battery 12. When the temperature of the storage battery 12 is equal to or greater than T1, the charging of the storage battery 12 can be performed without restriction on electric power.

In the example in FIG. 9, the control apparatus 200 first attempts to perform the charging of the vehicle 1 that has the highest priority level. However, the storage battery 12 of the vehicle 1 has an initial temperature that is lower than TO. Therefore, the charging cannot be immediately started. Consequently, the control apparatus 200 starts heating of the storage battery 12 in the vehicle 1 by transmitting a control signal to the control apparatus 100 of the vehicle 1. The temperature of the storage battery 12 gradually increases in the vehicle 1. The temperature of the storage battery 12 reaches TO at time t31 and reaches T1 at subsequent time t32.

Here, in this example, the heating of the storage battery 12 of the vehicle 1 is performed using the grid power that is supplied from the power supply apparatus 20. The heating of the storage battery 12 of the vehicle 1 may also be performed using the electric power that is stored in the storage battery 12. That is, the heating of the storage battery 12 may be performed by the internal temperature adjustment process.

During a period until time t31, the charging of the storage battery 12 cannot be performed in the vehicle 1. During this period, the control apparatus 200 retrieves a vehicle 10 of which the temperature of the storage battery 12 is equal to or greater than T1 among the other vehicles 10 that have lower priority levels than the vehicle 1. In the example in FIG. 9, the temperature of the storage battery 12 of the vehicle 3 is initially equal to or greater than T1.

In this case, the control apparatus 200 first starts the charging of the vehicle 3 until the charging of the vehicle 1 can be performed. When a plurality of such vehicles 10 are present, the vehicle 10 of which the temperature of the storage battery 12 is the highest among the plurality of vehicles 10 may be set as the vehicle 10 to be charged. Alternatively, the vehicle 10 that has the highest priority level among the plurality of vehicles 10 may be set as vehicle 10 to be charged.

At time t31 and subsequent thereto, the temperature of the storage battery 12 of the vehicle 1 exceeds T0. Therefore, the charging of the storage battery 12 can be performed with restriction in the vehicle 1. The control apparatus 200 starts the charging of the vehicle 1. In the vehicle 1, the electric power that is supplied to the storage battery 12 is gradually increased in accompaniment with the increase in temperature of the storage battery 12. In accompaniment, in the vehicle 3, the electric power that is supplied to the storage battery 12 is gradually decreased. The control apparatus 200 transmits the control signals to the respective control apparatuses 100 of the vehicles 10 and adjusts the charging power such that a sum of the electric power supplied to the storage battery 12 of the vehicle 1 and the electric power supplied to the storage battery 12 of the vehicle 3 does not exceed an output upper limit of the power supply apparatus 20.

At time t32, after the temperature of the storage battery 12 of the vehicle 1 reaches T1, the charging is performed as normal (that is, without restriction on the charging power) in the vehicle 1. In addition, the charging of the vehicle 3 is interrupted at time t32. The temperature of the storage battery 12 of the vehicle 3 gradually increases as a result of Joule heat during a period until time t32 and becomes substantially fixed at time t32 and subsequent thereto.

In the example in FIG. 9, the charging of the vehicle 1 is ended at time t35. Here, during a period from time t34 to time t35, the electric power that is supplied to the storage battery 12 of the vehicle 1 is gradually decreased in accompaniment with the stored power amount of the vehicle 1 approaching the target value.

The charging of the storage battery 12 of the vehicle 2 is performed following the charging of the storage battery 12 of the vehicle 1. In the example in FIG. 9, in manner similar to the storage battery 12 of the vehicle 1, the initial temperature of the storage battery 12 of the vehicle 2 is lower than T0. Therefore, the control apparatus 200 makes the control apparatus 100 of the vehicle 2 perform the process to heat the storage battery 12 and set the storage battery 12 to a suitable temperature in advance, before the charging of the storage battery 12 of the vehicle 2. In this example, the heating is performed using the grid power that is supplied to the vehicle 2 from the power supply apparatus 20. The heating of the storage battery 12 of the vehicle 2 may also be performed using the electric power that is stored in the storage battery 12. That is, the heating of the storage battery 12 may be performed by the internal temperature adjustment process.

The heating of the storage battery 12 of the vehicle 2 is started at time t33 that is after time t32 and before time t34. Time t33 is a time within a period during which the charging of the vehicle 1 is performed. The charging power of the vehicle 1 at time t33 and subsequent thereto decreases from that before by an amount amounting to the electric power supplied to the vehicle 2. The temperature of the storage battery 12 of the vehicle 2 gradually increases at time t33 and subsequent thereto as a result of the storage battery 12 being heated. The temperature reaches T0 before time t34 and reaches T1 at time t35. Time t33 at which the heating of the storage battery 12 of the vehicle 2 is started is set as a timing by which the temperature of the storage battery 12 of the vehicle 2 is able to reach T1 before time t35 at which the charging of the vehicle 1 is completed.

During a period from time t34 when the charging power of the vehicle 1 starts to decrease to time t35, the temperature of the storage battery 12 of the vehicle 2 is lower than T1. Therefore, in the vehicle 1, the charging of the storage battery 12 is performed with restriction during this period.

In the vehicle 2, the electric power that is supplied to the storage battery 12 is gradually increased in accompaniment with the increase in temperature of the storage battery 12. The control apparatus 200 transmits the control signals to the respective control apparatuses 100 of the vehicles 10 and adjusts the charging power such that the sum of the electric power that is supplied to the storage battery 12 of the vehicle 1 and the electric power that is supplied to the storage battery 12 of the vehicle 2 does not exceed the output upper limit of the power supply apparatus 20.

At time t35, after the temperature of the storage battery 12 of the vehicle 2 reaches T1, the charging of the vehicle 2 is performed as normal (that is, without restriction on the charging power).

In the example in FIG. 9, the charging of the vehicle 2 is ended at time t39. Here, during a period from time t37 to time t39, the electric power that is supplied to the storage battery 12 of the vehicle 2 is gradually decreased in accompaniment with the stored power amount of the vehicle 2 approaching the target value.

The charging of the storage battery 12 of the vehicle 3 is resumed following the charging of the storage battery 12 of the vehicle 2. As described earlier, in the example in FIG. 9, the temperature of the storage battery 12 of the vehicle 3 is initially a suitable temperature. Therefore, the process to heat the storage battery 12 in advance is not necessary.

At time t37 and subsequent thereto, in the vehicle 3, the electric power that is supplied to the storage battery 12 is gradually increased. The control apparatus 200 transmits the control signals to the respective control apparatuses 100 of the vehicles 10 and adjusts the charging power such that the sum of the electric power that is supplied to the storage battery 12 of the vehicle 2 and the electric power that is supplied to the storage battery 12 of the vehicle 3 does not exceed the output upper limit of the power supply apparatus 20.

At time t39, after the charging of the vehicle 2 is completed, the charging of the vehicle 3 is performed as normal (that is, without restriction on the charging power). In the example in FIG. 9, the charging of the vehicle 3 is ended at time t40. Here, in a manner similar to that in the vehicle 1 and the vehicle 2, in the vehicle 3 as well, the electric power is gradually decreased as the stored power amount of the storage battery 12 approaches the target value. The temperature of the storage battery 12 of the vehicle 3 gradually increases as a result of Joule heat during a period from time t37 to time t40.

Here, the control along the time chart shown in FIG. 9 can be started at an arbitrary timing. For example, the control may be started by manual operation by an operator after the plurality of vehicles 10 are connected by the cables 30. Alternatively, the control may be automatically started at a timing at which a predetermined time is reached. For example, when a fee for charging is changed for each time period, the control may be started at the time the fee changes. In addition, when a new vehicle 10 is additionally connected while the control is being performed, the priority levels may be reset at the timing at which the vehicle 10 is connected. The control may then be performed again in a manner similar to that described above based on the new priority levels. This similarly applies to other embodiments described hereafter.

Single-dot chain lines shown in the graphs in FIG. 9 indicate the changes over time in the parameters when the control of the comparative example is performed. In the comparative example, the charging of the vehicles 10 is performed in strict adherence to the priority levels that are set.

Specifically, the heating of the storage battery 12 of the vehicle 2 in the comparative example is started at time t35 when the charging of the vehicle 1 is completed. Therefore, the charging of the vehicle 2 is started at time t36 that is later than time t35 and is completed at subsequent time t41. Time t36 is a time at which the temperature of the vehicle 2 reaches T0. The temperature of the storage battery 12 of the vehicle 2 reaches T1 at subsequent time t38. Here, during a period immediately before time t41, the electric power that is supplied to the storage battery 12 of the vehicle 2 is gradually decreased in accompaniment with the stored power amount of the vehicle 2 approaching the target value.

In the comparative example, the charging of the vehicle 3 that has the lowest priority level is started at time t41 when the charging of the vehicle 2 is completed. The charging of vehicle 3 is completed at time t42 that is later than time t41. Here, during a period immediately before time t42, the electric power that is supplied to the storage battery 12 of the vehicle 3 is gradually decreased in accompaniment with the stored power amount of the vehicle 3 approaching the target value.

In this manner, in the comparative example, the heating of the secondary batteries 12 as required and the subsequent charging of the secondary batteries 12 are performed in the vehicles 10 in order in strict adherence to the priority levels that are set in advance. Therefore, time t42 at which the charging of all vehicles 10 is completed is a time that is later than time t40 at which the charging is completed according to the present embodiment.

In other words, the control apparatus 200 according to the present embodiment, while performing charging based on the priority levels in principle, can shorten the amount of time required for completion of charging compared to the comparative example by heating the storage battery 12 in advance in the vehicle 10 that has a low priority level and the like.

In the example shown in FIG. 9, for example, during the period from time t31 to time t32, charging may be simultaneously performed for both the vehicle 1 and the vehicle 3. Such simultaneous charging can be performed because the voltage that is supplied to the storage battery 12 of each vehicle 10 from the power supply apparatus 20 can be individually adjusted for each vehicle 10. When the vehicle 10 is not provided with the power converter 15 and only a single power converter 21 is provided on the power supply apparatus 20 side, the plurality of vehicles 10 cannot be simultaneously charged.

Figure 10:
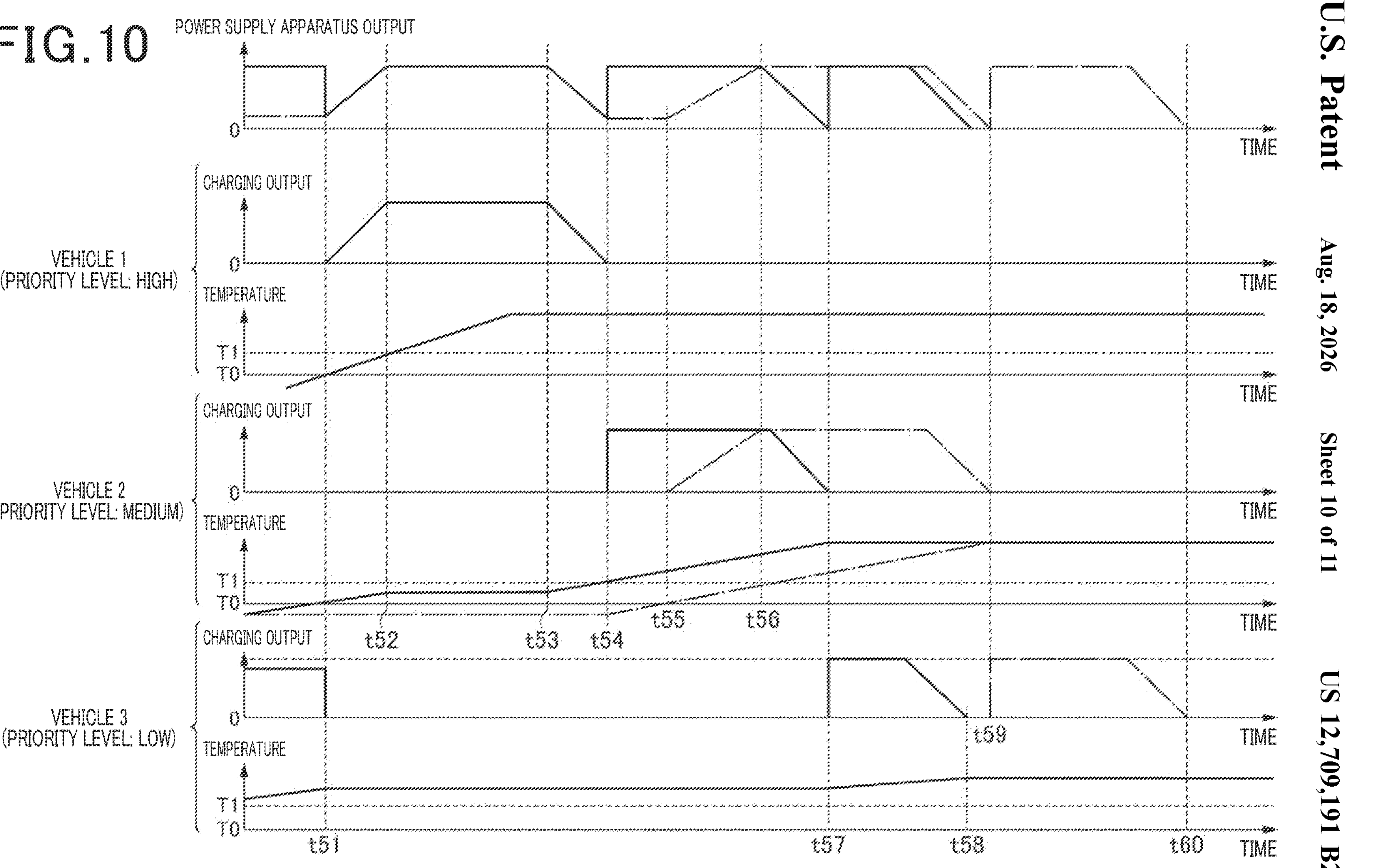
FIG. 10 is a graph illustrating another example of changes over time in charging power and the like of each vehicle when a plurality of vehicles are charged.

FIG. 10 shows an example of a case in which a plurality of vehicles 10 cannot be simultaneously charged as described above. The example is shown by a method similar to that in FIG. 9.

In the example in FIG. 10 as well, the control apparatus 200 first attempts to perform the charging of the vehicle 1 that has the highest priority level. However, the storage battery 12 of the vehicle 1 has an initial temperature that is lower than T0. Therefore, the charging cannot be immediately started. Consequently, the control apparatus 200 starts the heating of the storage battery 12 of the vehicle 1 by transmitting a control signal to the control apparatus 100 of the vehicle 1. The temperature of the storage battery 12 gradually increases in the vehicle 1. The temperature of the storage battery 12 reaches T0 at time t51 and reaches T1 at subsequent time t52.

Here, in this example, the heating of the storage battery 12 of the vehicle 1 is performed using the grid power that is supplied from the power supply apparatus 20. The heating of the storage battery 12 of the vehicle 1 may also be performed using the electric power that is stored in the storage battery 12. That is, the heating of the storage battery 12 may be performed by the internal temperature adjustment process.

During a period until time t51, the charging of the storage battery 12 cannot be performed in the vehicle 1. During this period, the timing adjusting unit 220 of the control apparatus 200 retrieves a vehicle 10 of which the temperature of the storage battery 12 is equal to or greater than T1 among the other vehicles 10 that have lower priority levels than the vehicle 1. In a manner similar to that in the example in FIG. 9, in this example as well, the temperature of the storage battery 12 of the vehicle 3 is initially equal to or greater than T1. The control apparatus 200 first starts the charging of the vehicle 3 until the charging of the vehicle 1 can be performed.

In this example, the charging of the vehicle 3 is performed until the charging of the vehicle 1 can be performed. In addition, the control apparatus 200 also performs the process to heat the storage battery 12 of the vehicle 2. The heating of the storage battery 12 of the vehicle 2 is also performed using the grid power that is supplied from the power supply apparatus 20. However, the heating of the storage battery 12 of the vehicle 2 may be performed using the electric power that is stored in the storage battery 12. That is, the heating of the storage battery 12 may be performed by the internal temperature adjustment process.

During the period until time t51, the power supply apparatus 20 supplies the electric power for heating the storage battery 12 to the vehicle 2 and supplies the charging power to the vehicle 3. A magnitude of the charging power that is supplied to the vehicle 3 during this period is a value obtained by the electric power supplied to the second vehicle 2 being subtracted from a maximum electric power that can be outputted.

At time t51 and subsequent thereto, the temperature of the storage battery 12 of the vehicle 1 exceeds T0. Therefore, the charging of the storage battery 12 can be performed with restriction in the vehicle 1. The control apparatus 200 stops the charging of the vehicle 3 and starts the charging of the vehicle 1. In the vehicle 1, the electric power that is supplied to the storage battery 12 is gradually increased in accompaniment with the increase in temperature of the storage battery 12. The temperature of the storage battery 12 of the vehicle 3 gradually increases as a result of Joule heat during the period until time t51 and is substantially fixed at time t51 and subsequent thereto.

At time t52, after the temperature of the storage battery 12 of the vehicle 1 reaches T1, the charging is performed as normal (that is, without restriction on the charging power) in the vehicle 1. The supply of electric power for heating the storage battery 12 to the vehicle 2 is temporarily interrupted at time t52. The temperature of the storage battery 12 of the vehicle 2 gradually increases during a period until time t52 and becomes substantially fixed at time t52 and subsequent thereto.

In the example in FIG. 10, the charging of the vehicle 1 is ended at time t54. Here, during a period from time t53 to time t54, the electric power that is supplied to the storage battery 12 of the vehicle 1 is gradually decreased in accompaniment with the stored power amount of the vehicle 1 approaching the target value. At time t53 and subsequent thereto, the supply of electric power for heating the storage battery 12 to the vehicle 2 is resumed. Therefore, the temperature of the storage battery 12 of the vehicle 2 starts to increase again. At time t54 when the charging of the vehicle 1 is completed, the temperature of the storage battery 12 of the vehicle 2 is T1 or higher.

In the example in FIG. 10 as well, the charging of the storage battery 12 of the vehicle 2 is performed following the charging of the storage battery 12 of the vehicle 1. As described above, the temperature of the storage battery 12 of the vehicle 2 increases to a temperature that is suitable for charging by time t54 when the charging of the vehicle 1 is completed. Therefore, at time t54, the charging is started as normal (that is, without restriction on the charging power) in the vehicle 2.

In the example in FIG. 10, the charging of the vehicle 2 is ended at time t57. Here, during a period immediately before time t57, the electric power that is supplied to the storage battery 12 of the vehicle 2 is gradually decreased in accompaniment with the stored power amount of the vehicle 2 approaching the target value.

The charging of the storage battery 12 of the vehicle 3 is resumed following the charging of the storage battery 12 of the vehicle 2. As described above, the temperature of the storage battery 12 of the vehicle 3 is initially a suitable temperature. Therefore, the process to heat the storage battery 12 in advance is not necessary.

In the vehicle 3, the charging is performed as normal (that is, without restriction on the charging power) from time t57. In the example in FIG. 10, the charging of the vehicle 3 is ended at time t58. Here, in a manner similar to that in the vehicle 1 and the vehicle 2, in the vehicle 3 as well, the electric power that is supplied to the storage battery 12 of the vehicle 3 is gradually decreased as the stored power amount of the storage battery 12 approaches the target value. The temperature of the storage battery 12 of the vehicle 3 gradually increases as a result of Joule heat during a period from time t57 to time t58.

In FIG. 10 as well, the changes over time in the parameters when control of the comparative example is performed are indicated by the single-dot chain lines. In this comparative example, charging of the vehicles 10 is performed in strict adherence to the priority levels that are set in advance.

Specifically, the heating of the storage battery 12 of the vehicle 2 in the comparative example is started at time t54 when the charging of the vehicle 1 is completed. Therefore, the charging of the vehicle 2 is started at time t55 that is later than time t54 and is completed at subsequent time t59. Time t55 is a time at which the temperature of the storage battery 12 of the vehicle 2 reaches T0. The temperature of the storage battery 12 of the vehicle 2 reaches T1 at subsequent time t56. Here, during a period immediately before time t59, the electric power that is supplied to the storage battery 12 of the vehicle 2 is gradually decreased in accompaniment with the stored power amount of the vehicle 2 approaching the target value.

In this comparative example, the charging of the vehicle 3 that has the lowest priority level is started at time t59 when the charging of the vehicle 2 is completed. The charging of vehicle 3 is completed at time t60 that is later than time t59. Here, during a period immediately before time t60, the electric power that is supplied to the storage battery 12 of the vehicle 3 is gradually decreased in accompaniment with the stored power amount of the vehicle 3 approaching the target value.

In this manner, in the comparative example, the heating of the secondary batteries 12 as required and the subsequent charging of the secondary batteries 12 are performed in the vehicles 10 in order in strict adherence to the priority levels that are set in advance. Therefore, time t60 at which the charging of all vehicles 10 is completed is a time that is later than time t58 at which the charging is completed according to the present embodiment.

In the example shown in FIG. 10, the control apparatus 200 according to the present embodiment, while performing charging based on the priority levels in principle, can shorten the amount of time required for completion of charging, compared to the comparative example by heating the storage battery 12 in advance in the vehicle 10 that has a low priority level and the like. The control apparatus 200 simultaneously performs the heating of the storage battery 12 in the vehicle 2 that has a low priority level and the charging of the vehicle 3 that has an even lower priority level, until the storage battery 12 of the vehicle 1 that has the highest priority level reaches a suitable temperature. At this time, the electric power that is supplied to the vehicle 2 and the vehicle 3 can be considered to be surplus power during a period in which the vehicle 1 that has the highest priority level is awaiting charging (until t51) or is being charged (t51 to t52). As a result of the surplus power that is not used to charge the vehicle 10 that has a high priority level being used in the vehicle 10 that has the low priority level in this manner, charging of all vehicles 10 can be completed in a short amount of time.

Figure 11:
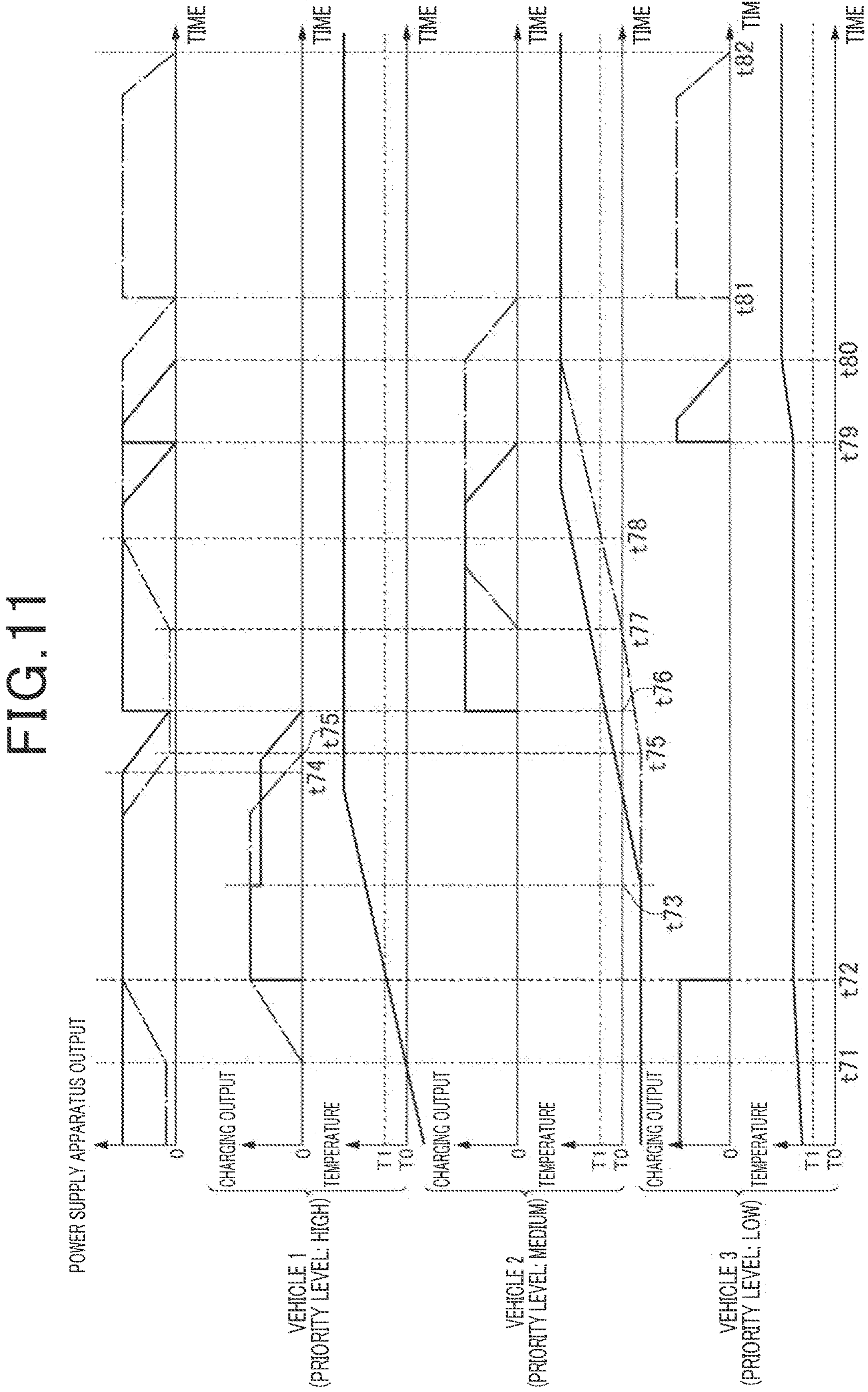
FIG. 11 is a graph illustrating yet another example of changes over time in charging power and the like of each vehicle when a plurality of vehicles are charged.

FIG. 11 shows another example of a case in which the plurality of vehicles 10 cannot be simultaneously charged. The example is shown by a method similar to that in FIG. 9 and FIG. 10.

In the example in FIG. 11 as well, the control apparatus 200 first attempts to perform the charging of the vehicle 1 that has the highest priority level. However, the storage battery 12 of the vehicle 1 has an initial temperature that is lower than T0. Therefore, the charging cannot be immediately started. Consequently, the control apparatus 200 starts the heating of the storage battery 12 of the vehicle 1 by transmitting a control signal to the control apparatus 100 of the vehicle 1. The temperature of the storage battery 12 gradually increases in the vehicle 1. The temperature of the storage battery 12 reaches T0 at time t71 and reaches T1 at subsequent time t72.

Here, in this example, the heating of the storage battery 12 of the vehicle 1 is performed using the grid power that is supplied from the power supply apparatus 20. The heating of the storage battery 12 of the vehicle 1 may also be performed using the electric power that is stored in the storage battery 12. That is, the heating of the storage battery 12 may be performed by the internal temperature adjustment process.

In the example in FIG. 11, the charging of the vehicle 1 is not performed until the temperature of the storage battery 12 of the vehicle 1 reaches T1. The charging of the vehicle 1 is started at time t72. During a period until time t72, the control apparatus 200 retrieves a vehicle 10 of which the temperature of the storage battery 12 is equal to or greater than T1 among the other vehicles 10 that have lower priority levels than the vehicle 1. In a manner similar to that in the examples in FIG. 9 and FIG. 10, in this example as well, the temperature of the storage battery 12 of the vehicle 3 is initially equal to or greater than T1. The control apparatus 200 first starts the charging of the vehicle 3 until the temperature of the storage battery 12 of the vehicle 1 is equal to or greater than T1.

At time t72, after the temperature of the storage battery 12 of the vehicle 1 reaches T1, the charging is performed as normal (that is, without restriction on the charging power) in the vehicle 1. The supply of charging power to the vehicle 3 is temporarily interrupted at time t72. The temperature of the storage battery 12 of the vehicle 3 gradually increases as a result of Joule heat during a period until time t72 and becomes substantially fixed at time t72 and subsequent thereto.

In the example in FIG. 11, the charging of the vehicle 1 is ended at time t76. Here, during a period immediately before time t76, the electric power that is supplied to the storage battery 12 of the vehicle 1 is gradually decreased in accompaniment with the stored power amount of the vehicle 1 approaching the target value.

The charging of the storage battery 12 of the vehicle 2 is performed following the charging of the storage battery 12 of the vehicle 1. According to the present embodiment, in a manner similar to the storage battery 12 of the vehicle 1, the initial temperature of the storage battery 12 of the vehicle 2 is lower than T0. Therefore, the control apparatus 200 makes the control apparatus 100 of the vehicle 2 perform the process to heat the storage battery 12 and set the storage battery 12 to a suitable temperature in advance, before the charging of the storage battery 12 of the vehicle 2. In this example, the heating is performed using the grid power that is supplied from the power supply apparatus 20 to the vehicle 2. The heating of the storage battery 12 of the vehicle 2 may also be performed using the electric power that is stored in the storage battery 12. That is, the heating of the storage battery 12 may be performed by the internal temperature adjustment process.

The heating of the storage battery 12 of the vehicle 2 is started at time t73 that is after time t72 and before time t76. Time t73 is a time during a period in which the charging of the vehicle 1 is being performed. The charging power of the vehicle 1 at time t73 and subsequent thereto decreases from that before by an amount amounting to the electric power supplied to the vehicle 2. The temperature of the storage battery 12 of the vehicle 2 gradually increases at time t73 and subsequent thereto as a result of the storage battery 12 being heated. The temperature reaches T1 at time t76. Time t73 at which the heating of the storage battery 12 of the vehicle 2 is started is set as a timing by which the temperature of the storage battery 12 of the vehicle 2 is able to reach T1 before time t76 at which the charging of the vehicle 1 is completed.

At time t76, the charging is performed as normal (that is, without restriction on the charging power) in the vehicle 2. In the example in FIG. 11, the charging of the vehicle 2 is ended at time t79. Here, during a period immediately before time t79, the electric power that is supplied to the storage battery 12 of the vehicle 2 is gradually decreased in accompaniment with the stored power amount of the vehicle 2 approaching the target value.

The charging of the storage battery 12 of the vehicle 3 is resumed following the charging of the storage battery 12 of the vehicle 2. As described above, the temperature of the storage battery 12 of the vehicle 3 is initially a suitable temperature. Therefore, the process to heat the storage battery 12 in advance is not necessary.

In the vehicle 3, the charging is performed as normal (that is, without restriction on the charging power) from time t79. In the example in FIG. 11, the charging of the vehicle 3 is ended at time t80. Here, in a manner similar to that in the vehicle 1 and the vehicle 2, in the vehicle 3 as well, the electric power that is supplied to the storage battery 12 of the vehicle 3 is gradually decreased as the stored power amount of the storage battery 12 approaches the target value. The temperature of the storage battery 12 of the vehicle 3 gradually increases as a result of Joule heat during a period from time t79 to time t80.

As in the example in FIG. 11, the charging of the vehicle 3 may be given highest priority during the period (until t72) until the charging of the vehicle 1 that has the highest priority level can be performed.

In FIG. 11 as well, the changes over time in the parameters when control of the comparative example is performed are indicated by the single-dot chain lines. In this comparative example, charging of the vehicles 10 is performed in strict adherence to the priority levels that are set in advance.

Specifically, the charging of the vehicle 1 in the comparative example is started at time t71 when the temperature of the storage battery 12 of the vehicle 1 reaches T0. In the vehicle 1, the electric power that is supplied to the storage battery 12 is gradually increased in accompaniment with the increase in temperature of the storage battery 12. After the temperature of the storage battery 12 of the vehicle 1 reaches T1 at time t72, the charging is performed as normal (that is, without restriction on the charging power) in the vehicle 1.

The heating of the storage battery 12 of the vehicle 2 in the comparative example is started at time t75 when the charging of the vehicle 1 is completed. Therefore, the charging of the vehicle 2 is started at time t77 that is later than time t75 and is completed at subsequent time t81. Time t77 is a time at which the temperature of the storage battery 12 of the vehicle 2 reaches T0. The temperature of the storage battery 12 of the vehicle 2 reaches T1 at subsequent time t78. Here, during a period immediately before time t81, the electric power that is supplied to the storage battery 12 of the vehicle 2 is gradually decreased in accompaniment with the stored power amount of the vehicle 2 approaching the target value.

In the comparative example, the charging of the vehicle 3 that has the lowest priority level is started at time t81 when the charging of the vehicle 2 is completed. The charging of the vehicle 3 is completed at time t82 that is later than time t81. Here, during a period immediately before time t82, the electric power that is supplied to the storage battery 12 of the vehicle 3 is gradually decreased in accompaniment with the stored power amount of the vehicle 3 approaching the target value.

In this manner, in the comparative example, the heating of the secondary batteries 12 as required and the subsequent charging of the secondary batteries 12 are performed in the vehicles 10 in order in strict adherence to the priority levels that are set in advance. Therefore, time t82 at which the charging of all vehicles 10 is completed is a time that is later than time t80 at which the charging is completed according to the present embodiment.

In the example shown in FIG. 11, the control apparatus 200 according to the present embodiment, while performing charging based on the priority levels in principle, can shorten the amount of time required for completion of charging compared to the comparative example by first charging the vehicle 10 that has a low priority level and of which the storage battery 12 is at a suitable temperature, and the like. The control apparatus 200 gives highest priority to the charging of the vehicle 3 that has a low priority level until the storage battery 12 of the vehicle 1 that has the highest priority level reaches a suitable temperature. As a result of surplus power that is not used to charge the vehicle 10 that has a high priority level being used in the vehicle 10 that has the low priority level in this manner, charging of all vehicles 10 can be completed in a short amount of time.

According to the embodiments described above, an example in which a maximum output of the power supply apparatus 20 is less than a maximum charging power of the vehicle 10 is described. When the maximum output is greater than the maximum charging power of the vehicle 10, charging may be performed, or the temperature regulator 14 may be operated and the storage battery 12 may be heated simultaneously in a plurality of vehicles 10, to an extent that the maximum output of the power supply apparatus 20 is not exceeded. That is, a number of vehicles 10 to be simultaneously charged and a number of vehicles 10 of which the temperature regulators 14 are simultaneously operated may differ from that in the examples according to the embodiments described above, as long as the electric power that is outputted from the power supply apparatus 20 does not exceed the maximum output. At this time, the vehicle 10 to be charged and the vehicle 10 of which the temperature regulator 14 is to be operated may be selected in order of the highest priority level to the lowest.

An example in which the temperature regulator 14 heats the storage battery 12 is described above. However, control to which a concept similar to that above is applied can also be performed when the temperature regulator 14 cools the storage battery 14 that is at a high temperature.

The present embodiment is described above with reference to specific examples. However, the present disclosure is not limited to the specific examples. Design modifications to the above-described specific examples made as appropriate by a person skilled in the art are included in the scope of the present disclosure as long as features of the present disclosure are included. Elements included in the above-described specific examples, as well as arrangements, conditions, shapes, and the like thereof are not limited to those given as examples and can be modified as appropriate. Combinations of elements included in the above-described specific examples can be changed as appropriate as long as technical inconsistencies do not occur.

The control apparatus and a control method thereof described in the present disclosure may be implemented by a single or a plurality of dedicated computers that are each provided such as to be configured by a processor and a memory, the processor being programmed to provide a single or a plurality of functions that are implemented by a computer program. The control apparatus and a control method thereof described in the present disclosure may be implemented by a dedicated computer that is provided by a processor being configured by a single or a plurality of dedicated hardware logic circuits. The control apparatus and a control method thereof described in the present disclosure may be implemented by a single or a plurality of dedicated computers that are each configured by a combination of a processor that is programmed to provide a single or a plurality of functions, a memory, and a processor that is configured by a single or a plurality of hardware logic circuits. The computer program may be stored in a non-transitory computer-readable (tangible) storage medium that can be read by a computer as instructions performed by the computer. The dedicated hardware logic circuit and the hardware logic circuit may be implemented by a digital circuit that includes a plurality of logic circuits or an analog circuit.

What is claimed is:

1. A control apparatus for a vehicle, the vehicle including a storage battery that stores therein electric power that is supplied from an external power supply apparatus, and a rotating electric machine that is driven by electric power from the storage battery, the control apparatus comprising:

a temperature adjusting unit that adjusts a temperature of the storage battery, wherein the temperature adjusting unit performs an internal temperature adjustment process that is a process for adjusting the temperature of the storage battery using energy other than the electric power supplied from the power supply apparatus, the temperature adjusting unit performs the internal temperature adjustment process using electric power stored in the storage battery, and the control apparatus further comprises a determining unit that determines a start timing of the internal temperature adjustment process.

2. The control apparatus according to claim 1, wherein:

the temperature adjusting unit performs the internal temperature adjustment process when an amount of electric power stored in the storage battery is equal to or greater than a predetermined value.

3. The control apparatus according to claim 2, wherein:

the temperature adjusting unit performs the internal temperature adjustment process when the temperature of the storage battery is outside a predetermined temperature range that is suitable for charging.

4. The control apparatus according to claim 1, further comprising:

an acquiring unit that acquires a connection timing of the vehicle and the power supply apparatus, wherein:

the determining unit determines the start timing as a timing that is before the connection timing by a predetermined amount of time.

5. The control apparatus according to claim 4, wherein:

the acquiring unit acquires the connection timing by predicting based on information acquired from outside.

6. The control apparatus according to claim 4, wherein:

the acquiring unit acquires the connection timing by input from an occupant or from an external source.

7. The control apparatus according to claim 1, wherein:

the determining unit determines the start timing by input from an occupant or from an external source.

8. The control apparatus according to claim 7, wherein:

the temperature adjusting unit determines whether the internal temperature adjustment process is performed based on both a predicted value of an amount of electric power required for the internal temperature adjustment process and a predicted value of electric power that can be supplied to the storage battery from the power supply apparatus.

9. The control apparatus according to claim 8, wherein:

the temperature adjusting unit determines whether the internal temperature adjustment process can be continued while performing the internal temperature adjustment process.

10. The control apparatus according to claim 1, wherein:

the temperature adjusting unit starts the internal temperature adjustment process before the vehicle and the power supply apparatus are connected to each other.

11. The control apparatus according to claim 1, wherein:

the temperature adjusting unit starts the internal temperature adjustment process after the vehicle and the power supply apparatus are connected to each other.

12. The control apparatus according to claim 11, wherein:

the temperature adjusting unit adjusts the temperature of the storage battery using the electric power supplied from the power supply apparatus while performing the internal temperature adjustment process.

13. The control apparatus according to claim 1, wherein:

the temperature adjusting unit performs the internal temperature adjustment process when the temperature of the storage battery is outside a predetermined temperature range that is suitable for charging.

14. The control apparatus according to claim 1, wherein:

the temperature adjusting unit determines whether the internal temperature adjustment process can be continued while performing the internal temperature adjustment process.

15. A control apparatus for a vehicle, the vehicle including a storage battery that stores therein electric power that is supplied from an external power supply apparatus, and a rotating electric machine that is driven by electric power from the storage battery, the control apparatus comprising:

a temperature adjusting unit that adjusts a temperature of the storage battery, wherein the temperature adjusting unit performs an internal temperature adjustment process that is a process for adjusting the temperature of the storage battery using energy other than the electric power supplied from the power supply apparatus, the temperature adjusting unit performs the internal temperature adjustment process using electric power stored in the storage battery, and the temperature adjusting unit determines whether the internal temperature adjustment process is performed based on both a predicted value of an amount of electric power required for the internal temperature adjustment process and a predicted value of electric power that can be supplied to the storage battery from the power supply apparatus.

16. A control system for a vehicle, the vehicle including a storage battery that stores therein electric power that is supplied from an external power supply apparatus, and a rotating electric machine that is driven by electric power from the storage battery, the control system comprising:

a processor;

a non-transitory computer-readable storage medium;

a set of computer-executable instructions stored in the computer-readable storage medium that, when read and executed by the processor, cause the processor to implement:

adjusting a temperature of the storage battery;

performing an internal temperature adjustment process that is a process for adjusting the temperature of the storage battery using energy other than the electric power supplied from the power supply apparatus, performing the internal temperature adjustment process using electric power stored in the storage battery; and determining a start timing of the internal temperature adjustment process.

17. A control method for a vehicle, the vehicle including a storage battery that stores therein electric power that is supplied from an external power supply apparatus, and a rotating electric machine that is driven by electric power from the storage battery, the control method comprising:

adjusting a temperature of the storage battery;

performing an internal temperature adjustment process that is a process for adjusting the temperature of the storage battery using energy other than the electric power supplied from the power supply apparatus, performing the internal temperature adjustment process using electric power stored in the storage battery; and determining a start timing of the internal temperature adjustment process.

18. A control system for a vehicle, the vehicle including a storage battery that stores therein electric power that is supplied from an external power supply apparatus, and a rotating electric machine that is driven by electric power from the storage battery, the control system comprising:

a processor;

a non-transitory computer-readable storage medium;

a set of computer-executable instructions stored in the computer-readable storage medium that, when read and executed by the processor, cause the processor to implement:

adjusting a temperature of the storage battery;

performing an internal temperature adjustment process that is a process for adjusting the temperature of the storage battery using energy other than the electric power supplied from the power supply apparatus;

performing the internal temperature adjustment process using electric power stored in the storage battery; and determining whether the internal temperature adjustment process is performed based on both a predicted value of an amount of electric power required for the internal temperature adjustment process and a predicted value of electric power that can be supplied to the storage battery from the power supply apparatus.

19. A control method for a vehicle, the vehicle including a storage battery that stores therein electric power that is supplied from an external power supply apparatus, and a rotating electric machine that is driven by electric power from the storage battery, the control method comprising:

adjusting a temperature of the storage battery;

performing an internal temperature adjustment process that is a process for adjusting the temperature of the storage battery using energy other than the electric power supplied from the power supply apparatus;

performing the internal temperature adjustment process using electric power stored in the storage battery; and determining whether the internal temperature adjustment process is performed based on both a predicted value of an amount of electric power required for the internal temperature adjustment process and a predicted value of electric power that can be supplied to the storage battery from the power supply apparatus.

* * * * *